US010229757B2

(12) United States Patent
Filippone et al.

(10) Patent No.: US 10,229,757 B2
(45) Date of Patent: Mar. 12, 2019

(54) MODULAR TRANSPORTABLE NUCLEAR GENERATOR

(71) Applicant: LOGOS TECHNOLOGIES LLC, Fairfax, VA (US)

(72) Inventors: Claudio Filippone, College Park, MD (US); Francesco Venneri, Los Alamos, NM (US)

(73) Assignee: LOGOS TECHNOLOGIES LLC, Fairfax, VA (US)

( * ) Notice: Subject to any disclaimer, the term of this patent is extended or adjusted under 35 U.S.C. 154(b) by 551 days.

(21) Appl. No.: 14/427,398

(22) PCT Filed: Sep. 12, 2013

(86) PCT No.: PCT/US2013/059445
§ 371 (c)(1),
(2) Date: Mar. 11, 2015

(87) PCT Pub. No.: WO2014/043335
PCT Pub. Date: Mar. 20, 2014

(65) Prior Publication Data
US 2016/0049210 A1  Feb. 18, 2016

Related U.S. Application Data

(60) Provisional application No. 61/699,864, filed on Sep. 12, 2012.

(51) Int. Cl.
*G21C 7/06* (2006.01)
*G21C 1/32* (2006.01)
(Continued)

(52) U.S. Cl.
CPC ............ *G21C 1/32* (2013.01); *F22B 1/063* (2013.01); *F22B 1/123* (2013.01); *F22B 37/007* (2013.01);
(Continued)

(58) Field of Classification Search
CPC .. G21D 1/00; G21D 1/02; G21D 5/00; G21D 5/02; G21C 1/00; G21C 1/32; G21C 1/322; G21C 1/324; G21C 1/326; G21C 1/328
See application file for complete search history.

(56) References Cited

U.S. PATENT DOCUMENTS

| 4,088,535 A | 5/1978 | Thompson et al. |
| 5,247,553 A | 9/1993 | Herring |
(Continued)

FOREIGN PATENT DOCUMENTS

| CN | 1526143 A | 9/2004 |
| CN | 1568526 A | 1/2005 |
(Continued)

OTHER PUBLICATIONS

H. Sekimoto "Fuel-Cycle of Candle Burnup with Depleted Uranium"; Proc. of ICAPP 2006; Jun. 4-8, 2006, Reno, Nevada; pp. 1908-1914; American Nuclear Society; LaGrange Park, IL.*
(Continued)

*Primary Examiner* — Marshall P O'Connor
(74) *Attorney, Agent, or Firm* — Drinker Biddle & Reath LLP

(57) ABSTRACT

The present invention relates generally to electric power and process heat generation using a modular, compact, transportable, hardened nuclear generator rapidly deployable and retrievable, comprising power conversion and electric generation equipment fully integrated within a single pressure vessel housing a nuclear core. The resulting transportable nuclear generator does not require costly site-preparation, and can be transported fully operational. The transportable nuclear generator requires an emergency evacuation area substantially reduced with respect to other nuclear generators as it may be configured for operation with a melt-proof
(Continued)

conductive ceramic core which allows decay heat removal even under total loss of coolant scenarios.

40 Claims, 21 Drawing Sheets

(51) Int. Cl.
    *G21C 7/08*     (2006.01)
    *G21C 9/033*     (2006.01)
    *G21C 13/02*     (2006.01)
    *G21D 5/02*     (2006.01)
    *F28F 1/42*     (2006.01)
    *F28D 7/00*     (2006.01)
    *F28D 7/10*     (2006.01)
    *F22B 1/06*     (2006.01)
    *F22B 1/12*     (2006.01)
    *F22B 37/00*     (2006.01)
    *G21C 19/00*     (2006.01)
    *G21C 7/28*     (2006.01)
    *G21C 15/04*     (2006.01)
    *G21C 3/30*     (2006.01)

(52) U.S. Cl.
    CPC ........... *F28D 7/0083* (2013.01); *F28D 7/106* (2013.01); *F28F 1/424* (2013.01); *G21C 7/08* (2013.01); *G21C 9/033* (2013.01); *G21C 13/02* (2013.01); *G21C 19/00* (2013.01); *G21D 5/02* (2013.01); *F28F 2215/06* (2013.01); *G21C 3/30* (2013.01); *G21C 7/28* (2013.01); *G21C 15/04* (2013.01); *Y02E 30/39* (2013.01)

(56) References Cited

U.S. PATENT DOCUMENTS

| | | | |
|---|---|---|---|
| 5,309,492 A | 5/1994 | Adams | |
| 2004/0131138 A1 | 7/2004 | Correia et al. | |
| 2004/0237535 A1 | 12/2004 | Ainsworth | |
| 2005/0013402 A1 | 1/2005 | Kriel | |
| 2010/0290578 A1 | 11/2010 | Farrell et al. | |
| 2011/0206173 A1 | 8/2011 | Walters | |
| 2011/0268241 A1 | 11/2011 | Keller | |
| 2012/0051978 A1 | 3/2012 | Kim et al. | |
| 2012/0140867 A1 | 6/2012 | Venneri et al. | |

FOREIGN PATENT DOCUMENTS

| | | |
|---|---|---|
| CN | 1756675 A | 4/2006 |
| CN | 202274790 U | 6/2012 |
| JP | 2001-188093 A | 7/2001 |
| JP | 2004-044411 A | 2/2004 |
| JP | 2004-522052 A | 7/2004 |
| JP | 2007-291869 A | 11/2007 |
| JP | 2011-503616 A | 1/2011 |
| JP | 2011-089973 A | 5/2011 |
| KR | 10-1089843 B1 | 12/2011 |
| RU | 2222839 C2 | 1/2004 |
| WO | WO 03/078191 A1 | 9/2003 |
| WO | WO 2009/097034 A2 | 8/2009 |
| WO | WO 2011/042406 A1 | 4/2011 |

OTHER PUBLICATIONS

Extended European search report dated Jul. 8, 2016 issued in corresponding European patent application No. 13837086.1 (10 pages).
First Chinese Office Action dated Jul. 20, 2016 issued in corresponding Chinese patent application No. 201380053031.7 (7 pages) and its English-language translation (9 pages).
Third Chinese Office Action dated Aug. 23, 2017 issued in corresponding Chinese patent application No. 201380053031.7 (18 pages) and its English-language translation thereof (16 pages).
Second Examiner's Report dated Mar. 22, 2017 issued in corresponding Canadian patent application No. 2,884,893 (3 pages).
S. N. Sikorin et al., "Shipment of HEU Fuel from Pamir Reactor in Belarus to the Russia and Conversion to High Density LEU Fuel," RERTR2011—33rd International Meeting on Reduced Enrichment for Research and Test Reactors, pp. 1-10, Dec. 31, 2011.
China Electrical Engineering Canon, vol. 6, Nuclear Power-Generating Engineering, Qizhen Ye, etc., pp. 1058-1119, China Electric Power Press, Jul. 31, 2009.
First Examiner's Report dated Apr. 29, 2016 issued in corresponding Canadian patent application No. 2,884,893 (4 pages).
Second Chinese Office Action dated Feb. 20, 2017 issued in corresponding Chinese patent application No. 201380053031.7 (19 pages) and its English-language translation thereof (16 pages).
Russian Office Action dated Aug. 18, 2017 issued in corresponding Russian patent application No. 2015113440 (6 pages) and its English-language translation thereof (7 pages).
First Japanese Office Action dated Jul. 25, 2017 issued in corresponding Japanese patent application No. 2015-532038 (6 pages) and its English-language translation thereof (11 pages).
Otsubo, Akira et al., "Parameter Analysis Calculation on Characteristics of Portable FAST Reactor," Document, Japan, Power Reactor and Nuclear Fuel Development Corporation, Jun. 1998, PNC TN9410 98-059 (62 pages).
Otsubo, Akira et al., "Research on R&D of Portable Reactor and Nuclear Battery," Document, Japan, Japan Nuclear Cycle Development Institute, Jan. 1999, NJC TN4420 98-001 (57 pages).

* cited by examiner

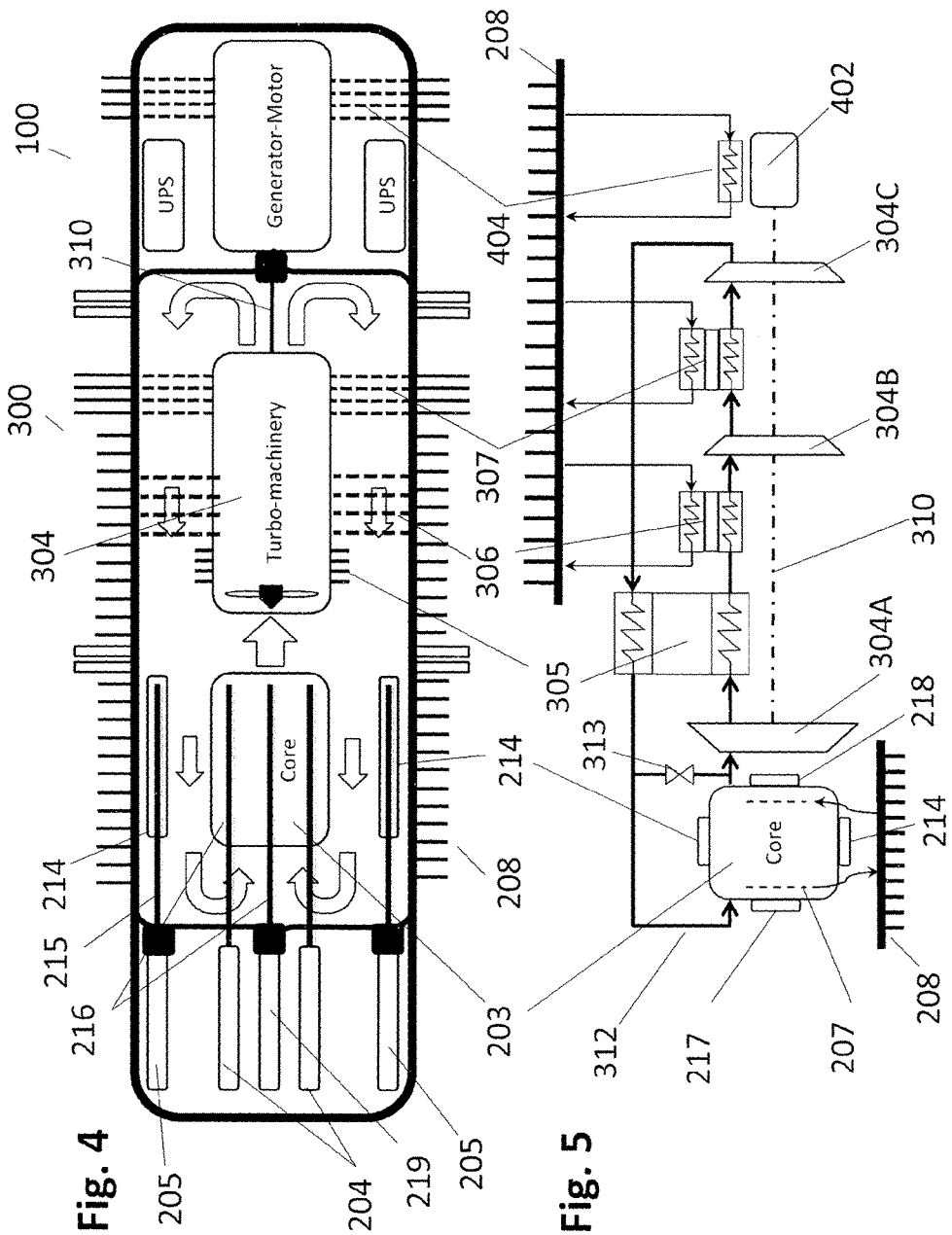

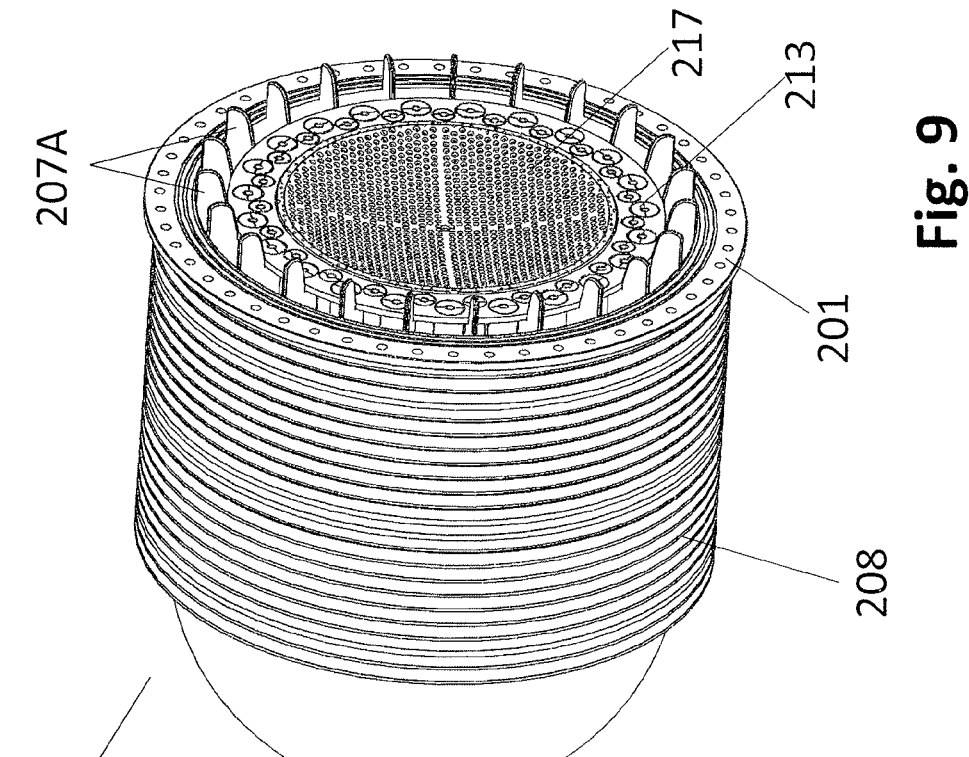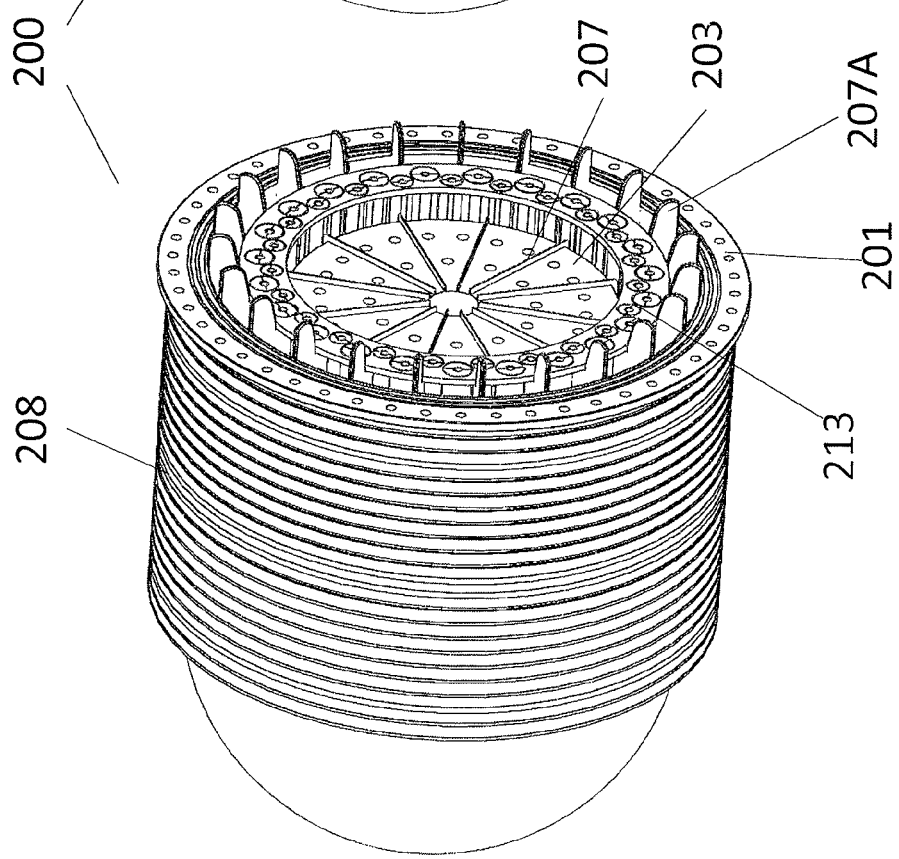

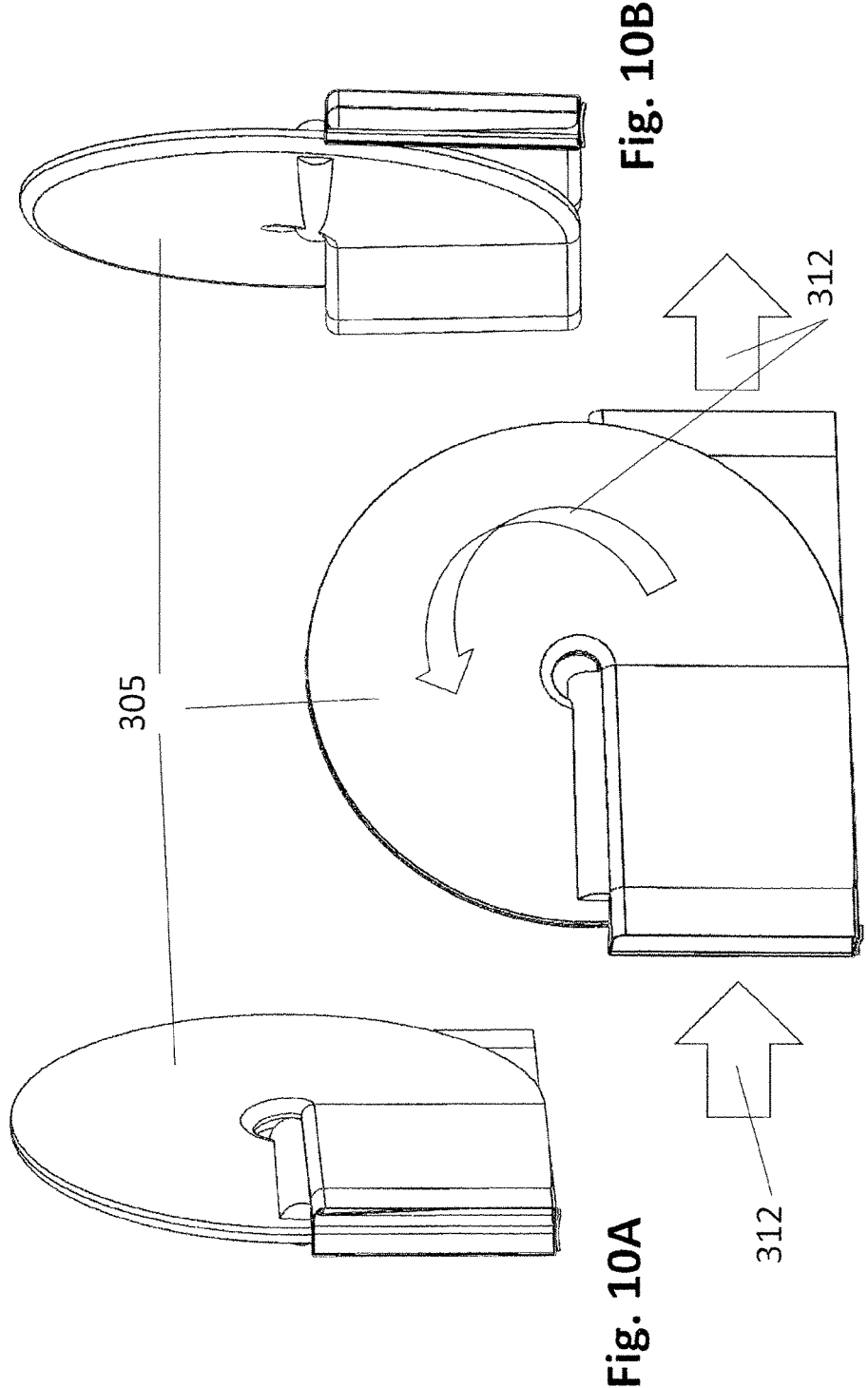

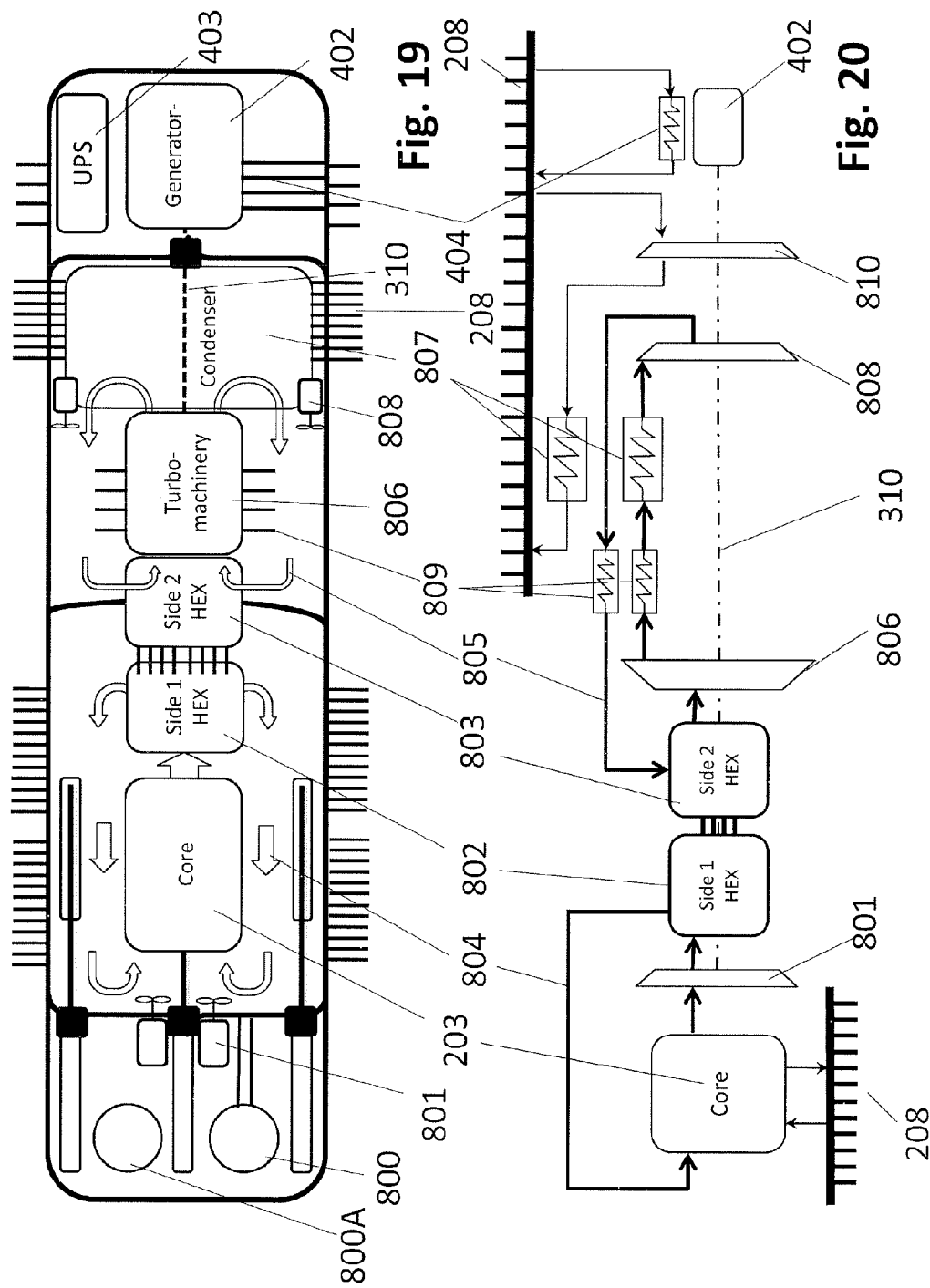

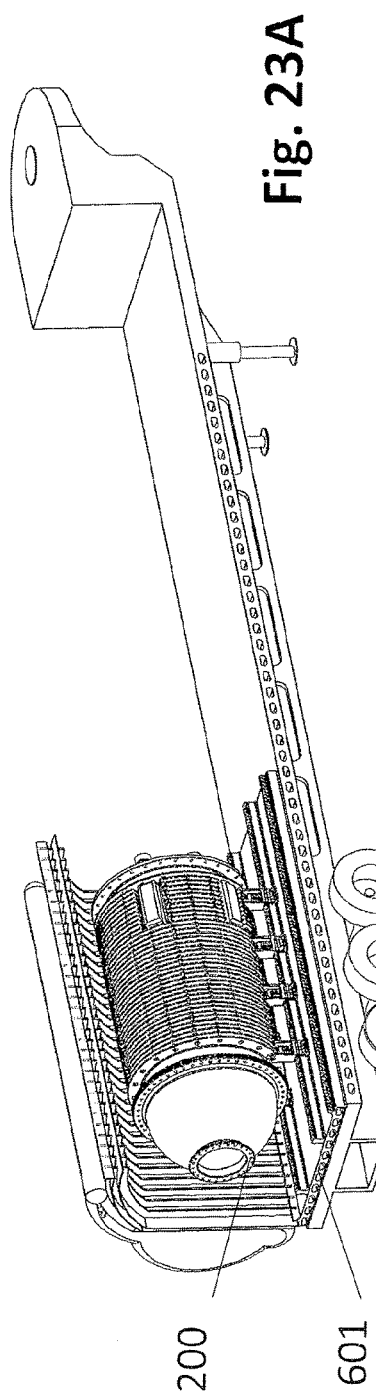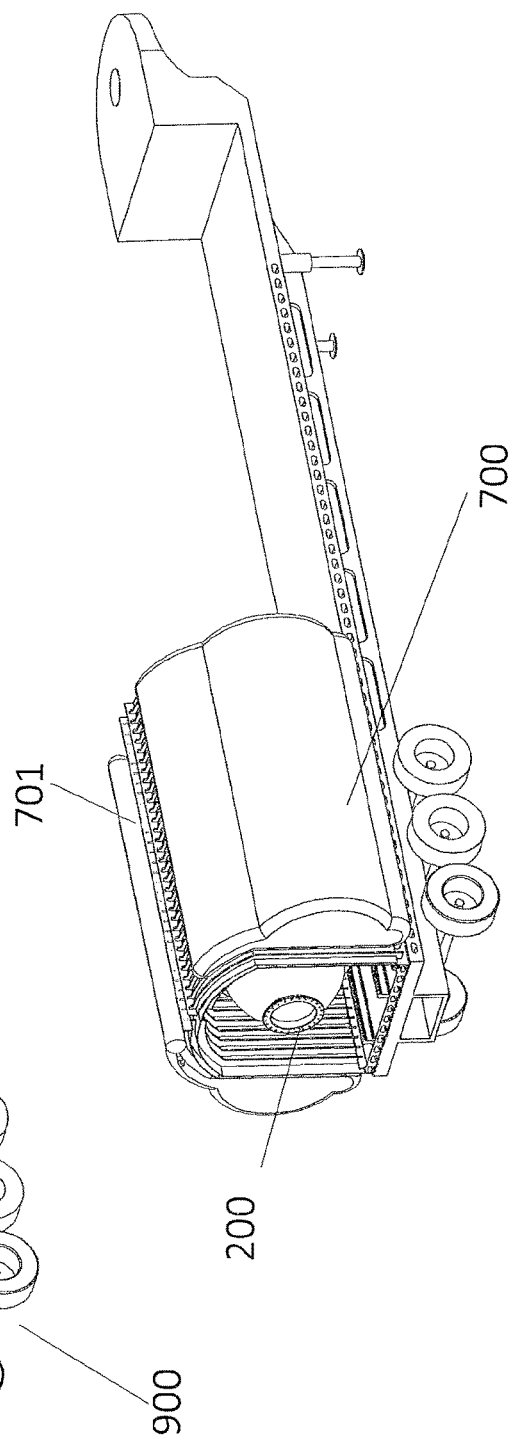

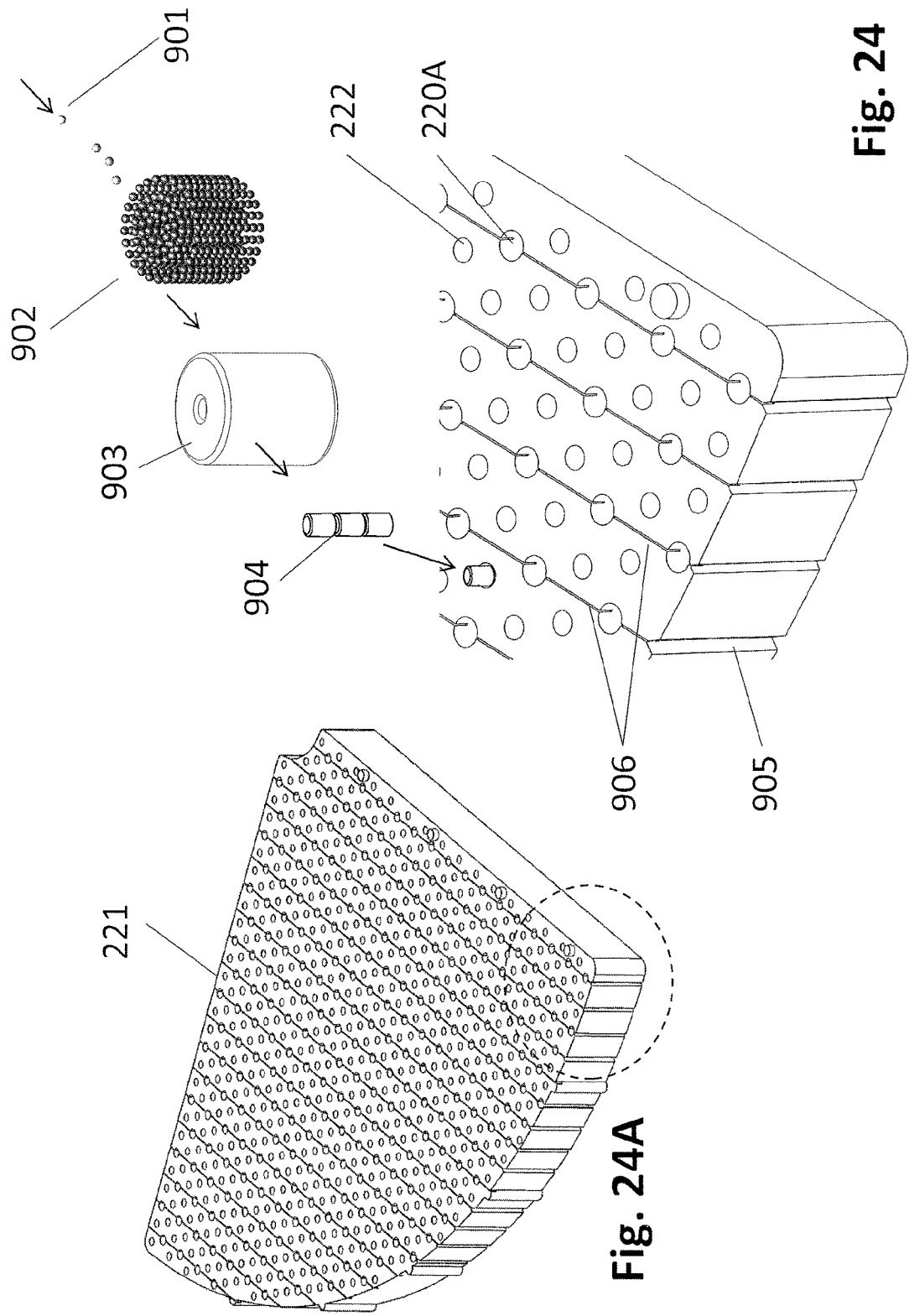

MODULAR TRANSPORTABLE NUCLEAR GENERATOR

CROSS REFERENCE TO RELATED APPLICATIONS

This application is a National Stage of International Application No. PCT/US2013/059445 filed Sep. 12, 2013, and which claims benefit of U.S. Provisional Application No. 61/699,864 filed Sep. 12, 2012, both of which are herein incorporated by reference in their entirety.

TECHNICAL FIELD

The present invention relates generally to electric power and process heat generation using of a modular, compact, transportable, hardened nuclear generator rapidly deployable and retrievable, comprising power conversion and electric generation equipment fully integrated within a single pressure vessel housing a nuclear core.

BACKGROUND

Nuclear generators naturally involve nuclear cores that produce decay thermal energy after shut down. Generally, among several factors, the amount of decay thermal energy produced after shutdown is proportional to the fuel power generation history and power density characterizing the nuclear core. To avoid overheating of the nuclear fuel in any location of the core, decay heat energy must be transferred from the core using redundant heat transfer mechanisms generally supported by systems external to the vessel and structures designed to contain the core. These redundant cooling systems comprise complex networks of piping thermal-hydraulically coupling the core to heat exchangers located outside of the vessel containing the core and dedicated to transfer thermal energy from the core to the environment (i.e. an ultimate heat sink). Coolant through these heat exchangers may actively circulate using electrically driven re-circulators (i.e. pumps, blowers) and redundancies are represented using multiple heat exchangers regulated by valves dedicated to route or re-route coolant through relatively complex piping networks. Alternatively, coolant may passively circulate through similarly complex piping networks, thermal-hydraulically coupling the core to extra-core heat exchangers, by gravity-driven natural circulation mechanisms based on the fact that coolant density changes when heated or cooled. Modern nuclear reactors rely on redundant core decay heat removal systems that may be operated passively, actively or a combination of both.

To remove decay thermal energy, reactor designs adopting "active" safety features extensively rely on electric power for the core to be maintained at safe temperatures after shutdown. To ensure safe operation and decay thermal energy removal at all times, these designs require electric power provided by connection to a minimum of two off-site power grids, and emergency electric power produced by dedicated redundant on-site emergency diesel generators (EDGs).

Some types of passive safety features, on the other hand, solely rely on gravity and large inventory of water generally stored in tanks or water structures positioned at relatively high elevations with respect to the core. Elevation differential between the core and the coolant storage structures is required for the coolant to undergo natural circulation siphoning, and effectively remove decay thermal energy from the core. For passive safety features based on stored coolant, the ability to adequately provide long-term decay heat removal is highly dependent on the coolant inventory and the effectiveness of the gravity-driven core-cooling mechanism under various environmental temperature and humidity conditions. Generally, as environmental temperature increases, the ability to passively generate convective core-cooling becomes gradually impaired. As a result passive decay heat removal based on stored coolant inventories is best suitable for nuclear generators operating in mild climates.

As passive and active safety systems generally develop externally to the vessel housing the core, the result is a complex system of redundant piping, valves, heat exchangers, as well as pumps/blowers and ancillary power and control cabling networks (i.e. required to provide motive-electric power and control for active systems). The complex system of piping and thermal-hydraulic (i.e. heat exchangers) and electric equipment (i.e. pumps) dedicated to remove thermal energy from the core is generally defined as balance of plant. The balance of plant of most nuclear generators, large and small, induces substantially large plant foot-prints, imposes limitations on the sites at which the nuclear generators can be deployed, and significantly increases the capital cost characterizing nuclear generator installations.

Nuclear cores of commercially operating reactors are generally cooled by water and loaded with nuclear fuel elements cladded with materials that oxidize in the presence of high temperature water/steam. As a core may experience overheating due, for example, to loss of coolant, or failure of the active or passive core decay heat removal systems, chemical reactions between cladding materials and water/steam result in the production of hydrogen. Hydrogen then accumulates and eventually self-ignites, thereby posing severe safety challenges. As a result, nuclear power plants are equipped with redundant hydrogen management equipment to, for example, execute controlled ignitions and prevent accumulation of large hydrogen amounts. However, this additional safety feature further adds complexity, increases operating cost and may not be as manageable as demonstrated by several nuclear accidents as, for example, the accident that occurred at the Fukushima Daiichi nuclear station in Japan. The level of redundancies employed to ensure active, passive, or a combination of both safety systems, execute they safety functions are generally the result of probabilistic risk assessments based on postulated design basis accident scenarios. Not all possible accident scenarios are contemplated as the probability for the occurrence of beyond design basis accident scenarios is very low. Unfortunately, despite redundancies and multiple engineered barriers to the escape of radioactivity from the core to the environment, core meltdown, hydrogen explosions, containment breach and large radioactive fall out have occurred even for nuclear generating stations compliant with the most up to date regulatory guidance for safe operation (i.e. Fukushima Daiichi power station), thus demonstrating that catastrophic accidents, as those triggered by beyond design basis accident scenarios, have an unacceptable safety and economic impact even though their probability of occurrence is very low. Beyond design basis accident scenarios may be represented by extreme seismic, tsunami, weather related, terrorist/hostile events.

Small modular reactor designs are characterized by smaller, modular and more easily transportable components when compared to large modern reactor designs. However, these components, or modules, cannot operate without first being thermal-hydraulically (and electrically) coupled at the site of deployment. Coupling of these modular components occurs by interconnection with complex networks of piping, valves, passive and/or active core cooling systems (balance of plant), configured outside of the vessel comprising the core. As a result deployment, and installation of an electric station based on small modular reactor designs, requires several months for site preparation, installation of balance of plant equipment, and coupling of all auxiliaries regardless of the size of the small modular reactor. In fact, once small modular reactor systems are coupled, the total small modular reactor-based electric station footprint and emergency evacuation zone remain still substantial, even for small modular reactor designs producing modest or very low power ratings. Once assembled, small modular reactor designs cannot be transported or retrieved and therefore cannot be readily deployed nor they can be retrieved from a site without undergoing disassembly of modular components and several months dedicated to dismantling the balance of plant, with generally lengthy decommissioning procedures for the removal of several separate and potentially radioactive small modular reactor components.

SUMMARY OF THE INVENTION

In view of the foregoing, there is an ongoing need for a truly transportable, fully operational, compact modular nuclear generator system and method for safely producing electric energy, with the option to provide process heat, capable of safely operating in any climatic conditions, at any site with the ability of safely cope with extreme environmental stressor (including severe seismic and flooding events), and in a manner that inherently reduces the consequences of postulated design basis as well as beyond design basis accident scenarios.

In view of the above, a transportable hardened compact modular nuclear generator is disclosed. The disclosed generator is formed by a nuclear core housed in a vessel comprising the integral power conversion and power generation equipment with no need for extra-vessel balance of plant and comprising features that passively ensure core cooling under all accident scenarios, including beyond design basis accident scenarios and design basis attack scenarios.

Depending on site-specific electric demand (and process heat requirements), the transportable, hardened, compact modular nuclear generator, for simplicity hereinafter referred to as transportable nuclear generator, may be configured to operate with various core configurations, materials, coolants and moderators, so as to convert thermal energy generated by the core into electricity and process heat using integral power conversion equipment configured to operate with various thermodynamic power cycles (i.e. Brayton, Rankine) and power generation equipment configured to condition voltage and frequency to match site-specific electric requirements.

In some configurations, the transportable nuclear generator may provide power ratings from 10 MWt-to-40 MWt (Mega-Watt-thermal), with an efficiency of approximately 45%, when operated with a power conversion module configured to convert thermal energy via gas-Brayton cycle. Under this exemplary configuration, a single transportable nuclear generator represents a power generation unit capable of producing 4.5 MWe-to-18 MWe (Mega-Watt-electric). As the transportable nuclear generator may operate with passive cooling via natural air-circulation across its heat transfer surfaces, it can be clustered with multiple transportable nuclear generator units so as to match site-specific electric and/or process heat demands. As the transportable nuclear generator is easily transportable and retrievable, it is suitable for a variety of applications, for example, it can be utilized for electric power generation and process heat applications in remote areas or grid-unattached locations. Additional applications may include power generation for various land-based or artificial island industrial-processes (mining, oil-gas extraction, military installations), ship propulsion and as rapid grid back-up system at critical bulk power grid interconnections.

In one exemplary configuration, the transportable nuclear generator is formed by three main modules: (1) the swappable reactor power module, housing the core, control systems and coolant flow reversing structure, (2) the power conversion module, comprising turbo-machinery equipment, and heat exchangers, and (3) the power generation module, comprising a fast generator-motor, electronic controllers and Uninterruptable Power Sources (i.e. batteries) to be utilized during start-up operations. Once thermal-hydraulically coupled through sealing flanges the three modules form a single hardened vessel passively exchanging thermal energy with the surrounding environment. The rotary equipment forming the turbo-machinery systems of the power conversion module are mechanically coupled to a single shaft also mechanically coupled to the shaft of the rotary components integrated in the generator-motor of the power generation module, thus all of the rotary equipment is matched to rotate at the same speed frictionless using magnetic bearings. Each module may be transported independently, or all three fully assembled into a single vessel that allows the transportable nuclear generator to be readily operational. Fully assembled or in separate modules transport of transportable nuclear generator may be executed in compliance with transportation standards (i.e. utilizing standard transportation equipment). When transported fully assembled, the transportable nuclear generator represents a rapidly deployable and retrievable fully operational electric power generator.

In one exemplary configuration, the transportable nuclear generator modules may be coupled using sealing and locking flanges so as to form a single hardened pressure vessel operating horizontally. In another configuration with re-oriented external and internal transportable nuclear generator heat transfer fins, the transportable nuclear generator may operate vertically. All three modules comprise highly integrated heat exchangers formed by internal and external fins configured to provide support to internal components while substantially reinforcing the overall structure by forming multiple internal and external structural ribs. The integral heat exchangers, combined with integral turbo-machinery and generator-motor equipment, allow for operation without need for external balance of plant, thereby substantially decreasing overall footprint, vulnerabilities, and the probability for loss of coolant scenarios. The transportable nuclear generator may employ several types of cores, including melt-proof conductive ceramic cores. The transportable nuclear generator coolant flow paths are configured to ensure high efficiency conversion of thermal energy into electric energy. These coolant pathways are obtained by positioning internal fins with low fluid-dynamic drag that provide core structural support while ensuring transfer of decay thermal energy from the core to the transportable nuclear generator external fins by conduction heat transfer mechanisms. In this configuration, the transportable nuclear generator core can safely and passively transfer decay thermal energy to the environment surrounding the transportable nuclear generator even in the total absence of coolant. The three modules forming the single vessel transportable nuclear generator are now described in more detail.

In one configuration, the reactor power module integrates the reactor core fueled with enriched fissile material (i.e. uranium or plutonium), neutron reflectors, multiple reactivity control systems, flow channels for the coolant to efficiently circulate through the reactor power module and thermal-hydraulic systems coupling the reactor power module to the power conversion module. The reactor power module vessel may be preferentially made of C-C composite material or suitable metallic material. The core may be any suitable core with material composition and heat transfer characteristics satisfying power-rating requirements.

A preferential core configuration comprises a conductive ceramic core with ceramic micro-encapsulated fuel embedded into silicon carbide (SiC) to form fuel elements.

In one exemplary configuration, the transportable nuclear generator is equipped with a "melt-down proof" core comprising monolithic tri-structural isotropic fueled (MTF) elements. In this configuration, the core is made of fuel elements, manufactured with TRISO fuel in SiC pellets, hereinafter referred to as fully ceramic micro-encapsulated (FCM) fuel, sealed into the SiC or SiC-composite elements, or with tri-structural isotropic (TRISO) particles distributed in MTF elements. Any sintering, compacting or other SiC fabrication process may be used that produces SiC of adequate structural strength and resistance to irradiation in the pellet and/or the blocks. In one preferred configuration the nano-infiltration and transient eutectic phase (NITE) SiC sintering process may be used. The pellet may have a layer of unfueled SiC to surround the fueled region.

The fissile fuel employed in the TRISO particles may be an oxide, carbide, oxycarbide or a nitride of uranium, plutonium, thorium or other fissile isotope. A burnable poison rare earth oxide such as Erbia or Gadolinia may be incorporated in the SiC ceramic compact. The burnable poison may also be contained in special coated particles mixed in with the fuel particles forming the pellets. The high-density non-porous SiC coating of the TRISO particles, the dense SiC matrix of the FCM fuel pellet and the SiC in the fuel element provide multiple barriers to fission product migration and dispersion, in a form that is at the same time radiation tolerant, heat conductive and compatible with high temperature operations.

In another example, the transportable nuclear generator may be loaded with a thermally conductive ceramic core, wherein the conductive ceramic core is composed of the MTF elements or blocks and similarly configured reflector elements or blocks (made, for example, of carbon or SiC-composite material). In this configuration, the MTF is designed and dimensioned to avoid excessive thermal stresses during operation. One example is the quarter-circle 10-cm thick plates indicated in FIGS. 24 and 24A. Other examples are hexagonal or rectangular fuel blocks. In all configurations, fuel and reflector blocks or elements contain holes for a coolant to flow. In all configurations, pressure plates with matching coolant holes may be included at the inlet and outlet of the core to keep the core under compression at all times. The thermal conductivity of the conductive ceramic core matrix is also enhanced by the elimination of gaps between fuel compacts and blocks and the reduction of gaps between blocks, thereby reducing fuel temperature and supporting the transportable nuclear generator core passive heat transfer capability under all accident scenarios.

Core reactivity may be controlled by absorbing neutrons in the reflector and preventing them from re-entering the core and by absorbing core neutrons. In the transportable nuclear generator core reactivity is controlled by operating: (1) control rods or rotary control drums in the reflector, containing neutron absorbing and reflecting materials arranged in a way to be passively engaged in absorbing mode for safety; (2) an array of in-core control rods; (3) an emergency shutdown system that injects neutron poison in the core through a passive system if the other systems fail. Control drums may feature absorbing and reflecting materials geometrically arranged so as to allow more or less neutrons to escape or be reflected back into the core depending on the rotational position. The neutron absorbing material may be a SiC-based or C-based ceramic with boron or a rare earth neutron capturing material, while the neutron reflector portions may utilize beryllium or other materials in a suitable high-temperature compatible form, with favorable neutron reflecting properties. These reactivity control features may operate independently and each may be capable of full or partial control of the core reactivity to regulate power and accomplish reactor shutdown.

Other reactor core configurations may be utilized, such as fuel rods containing nuclear fissile material in the form of oxide, nitride, metal or other, with metallic or ceramic cladding and arranged in bundles as appropriate to the coolant medium. Loose fuel elements of suitable geometric shape, such as spherical pebbles may also be used.

In one configuration, the transportable nuclear generator core uses an inert gas as coolant and working fluid for the power conversion module. In this configuration, the coolant could be $CO_2$, helium, or other preferably inert gases (e.g., argon). In this example, the transportable nuclear generator core produces thermal energy while the turbo-machinery combined with various integral heat exchangers, contributes to perform a regenerative Brayton cycle, achieving high power conversion efficiency.

In another configuration, the transportable nuclear generator core uses water as coolant and partially as a moderator circulating in a primary loop fully enclosed in the reactor power module. Pressure in the primary loop is regulated using an integral pressurizer. One or multiple integral separation heat exchangers provide the thermal coupling between the primary loop in the reactor power module and a secondary loop in the power conversion module. Water circulating in the secondary loop receives thermal energy from the primary loop side of the separation heat exchanger (i.e. steam generator) so as to change thermodynamic state from sub-cooled liquid to superheated steam. Water in the secondary loop does not mix with the water circulating in the primary loop. In this configuration the transportable nuclear generator core thermal energy is transferred to the turbo-machinery in the power conversion module in the form of super-heated steam. After expanding in the turbo-machinery, steam is vented to an integral condenser which passively transfers thermal energy to the internal and externally extended cooling fins of the power conversion module. As steam condenses, it is re-pressurized by a set of pumps and the secondary loop is reset by pumping sub-cooled water at the inlet of the secondary side of the separation heat exchanger.

In another configuration, the transportable nuclear generator primary loop may comprise liquid metal actively circulated using recirculation pumps or passively, for thermal energy transfer to the secondary side of one or multiple separation heat exchangers. In this transportable nuclear generator core configuration, the secondary side may be coupled to a power conversion module utilizing turbo-machinery designed to satisfy the requirements of a regenerative Brayton power cycle with gas as a working fluid, or a power conversion module utilizing turbo-machinery and condenser designed to satisfy Rankine power cycle requirements, with water as working fluid.

Independently of the power conversion module configurations, utilizing components designed to support Brayton or Rankine power cycle requirements, the power conversion module is directly coupled to the power generation module as rotary components forming the turbo-machinery in the power conversion module and the rotary components forming the generator-motor of the power generation module are directly mechanically coupled to the rotary shaft so as to rotate at the same velocity. The rotational speed of the shaft is determined by the thermo-hydraulics of the power conversion system, loading conditions and settings of the electronic control system regulating the electric generator-motor machine. The frequency and other electric parameters of the generator power may be controlled by integral electronic conditioning circuits.

In one configuration, the power generator in the power generation module may be switched to operate as an electric motor to drive the turbo-machinery of the power conversion module during startup and after shutdown. In this configuration, startup power may be provided through a set of batteries (i.e. uninterruptable power sources), or an external source of electric power (e.g., small diesel-electric set).

In most configurations, the shaft coupling all rotary components integrated in the power conversion module and power generation module may be coupled to the stationary structures of the corresponding modules using magnetic bearings. To ensure complete separation and independence of all modules, the power conversion module and power generation module modules, when coupled, utilize a flexible coupling to mechanically couple the shaft.

In other configuration, a clutch may be envisioned should the rotary components of the power generation module be required to disengage from the power conversion module rotary components, or should a particular application require a differential rotary speed between the rotary components of these two modules. The following discussion emphasizes key and general transportable nuclear generator features.

In all configurations (i.e. utilizing gas or liquids as coolant and/or working fluids), the transportable nuclear generator presents high component-level modularity and integration to provide a very compact transportable power-generating unit rapidly deployable and retrievable. The transportable nuclear generator features three pre-configured modules forming a single vessel when coupled. Each module can be mass-produced, easily transported independently or fully assembled and operational. The reactor power module can be hot swapped at the end of the refueling cycle or should an emergency (i.e. military operations) require rapid retrieval of the core, for example, via air lift (i.e. C17 air-transport or heavy lift helicopter transport).

The transportable nuclear generator components forming the three modules rely on existing technologies (turbo-machinery from various commercial applications, and generator-motor from fast alternator-motor technologies with magnetic bearings), or mature technologies developed and tested at various national laboratory and internationally (e.g., FCM fuel). The reactor power module contains, supports, protects and cools the nuclear core, a power conversion module, comprising turbo-machinery (turbines and compressor equipment for a gas cooled transportable nuclear generator configuration), integral heat exchangers (i.e. recuperator, pre-cooler and inter-cooler) as suited to the selected coolant and thermodynamic power cycle (i.e. regenerative, or partial Brayton or Rankine), and the power generator module, containing a starter/generator unit.

The fully assembled transportable nuclear generator may be configured to operate horizontally with minimum site preparation or vertically for underground installations. In all configurations, the transportable nuclear generator allows rapid fielding and startup, as well as fast retrieval of the full reactor or the individual modules. Refueling may be executed by swapping the "used" reactor power module, containing the spent core, with a new module containing a fresh core. Should malfunctions develop in the power conversion module or power generation module their replacement will be executed by simply swapping the malfunctioning module with a new or factory-refurbished one.

Depending on the selected working fluid, the transportable nuclear generator does not require the complex network of piping and equipment normally forming the balance of plant of all small modular reactor designs. The transportable nuclear generator is fully integrated and ready to produce power immediately after deployment. If the transportable nuclear generator is configured for horizontal operations, the resulting power generator allows easy deployment at sites characterized by seismic activities, on-board ships and several other applications requiring critical power. The reactor power module, power conversion module, and power generation module may be designed to be individually and independently secured onto standardized transport, operational, and storage platforms, with a variety of transportation options in compliance with civilian and military transportation standards.

The transportable nuclear generator does not require large bodies of water for its passive cooling, and may utilize local water or dry, non-evaporative, or simply environmental air as its ultimate heat sink. In off-normal situations, the transportable nuclear generator will be capable of relying solely on passive decay thermal energy removal from the core through conduction heat transfer (in the total absence of core coolant) to the walls of the finned modules, and passive convective heat transfer to the ambient air surrounding the transportable nuclear generator. The reactor power module, when separated from the rest of the transportable nuclear generator for refueling, is capable of passive decay heat removal solely based on radiative and ambient air convective mechanisms.

When the transportable nuclear generator is configured to operate with a power conversion module based on Brayton cycle conversion, it provides the option of utilizing high temperature reject heat that can be used to support various process heat applications. In this configuration, the transportable nuclear generator may be equipped with heat exchangers for the production of low- and/or high-grade process heat to be distributed to equipment dedicated to desalination, bio-fuel processing, district heating, or other industrial uses.

The power generation module may be configured to start the turbo-machinery while heating and pressurizing the transportable nuclear generator primary loop with the support of uninterruptable power sources represented by integral battery pack (i.e. comprised with the power generation module), or a small external diesel-electric generator. A fully assembled transportable nuclear generator unit represents a power plant capable of startup, shutdown, normal operation, while passively maintaining safe fuel temperature margins during transients and emergency conditions.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, reference numerals designate corresponding parts throughout the different views.

FIGS. 4 and 5 illustrate a cross-sectional view and a functional diagram of a gas-cooled configuration of an example implementation of a transportable nuclear generator shown in FIG. 1.

FIGS. 8 and 9 illustrate perspective views of the reactor power module without and with a top core reflector respectively as an example of a transportable nuclear generator reactor power module.

FIGS. 10, 10A and 10B are perspective views of an example implementation of a low backpressure integral heat exchanger functioning as a "recuperator" comprised with the power conversion module illustrated in FIG. 6.

FIGS. 19 and 20 is a top view and a functional diagram respectively of the exemplary transportable nuclear generator block diagram shown in FIG. 18.

FIGS. 23 and 23A are perspective representations of an exemplary reactor power module of the transportable nuclear generator, secured on a standard transport platform for rapid "hot" reactor power module transport (i.e. emergency site extraction), herein shown with add-on passive cooling features and inflatable shields to ensure radioactive shielding under hot core removal scenarios.

FIGS. 24 and 24A are perspective views of preferential conductive ceramic core elements and Fully Ceramic Microencapsulated fuel elements forming a melt-proof core that can be passively cooled even in total absence of coolant.

DETAILED DESCRIPTION

The transportable nuclear generator exemplary configurations disclosed herein are described in the context of providing a safe, rapidly transportable and operational nuclear generator system for various applications requiring electric energy and process heat. Those of ordinary skill in the art will understand that the transportable nuclear generator integral modules may be configured for any power demanding application having a need for reliable and continuous electric power, possibly at location with no other alternative of employing diesel-electric generators with high operating cost and pollutant emissions. The transportable nuclear generator may be configured with different fin shapes to enhance passive heat transfer mechanisms from the transportable nuclear generator internals to the environment (ultimate heat sink).

Figure 1:
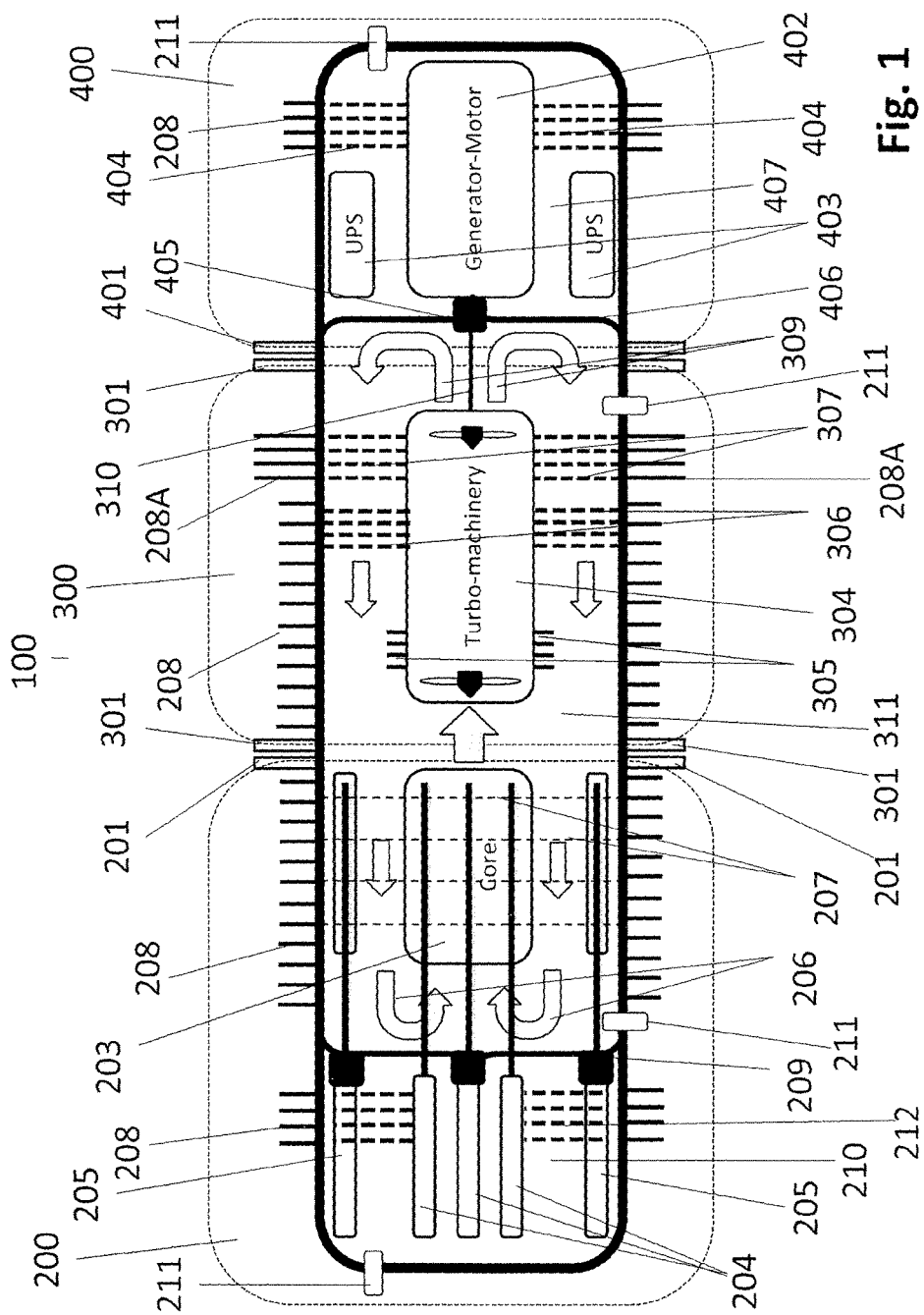
FIG. 1 is a top perspective cross-sectional view of an example transportable nuclear generator block diagram indicating the boundaries of the reactor power module, the power conversion module, and the power generation module of an exemplary implementation.
Figure 2:
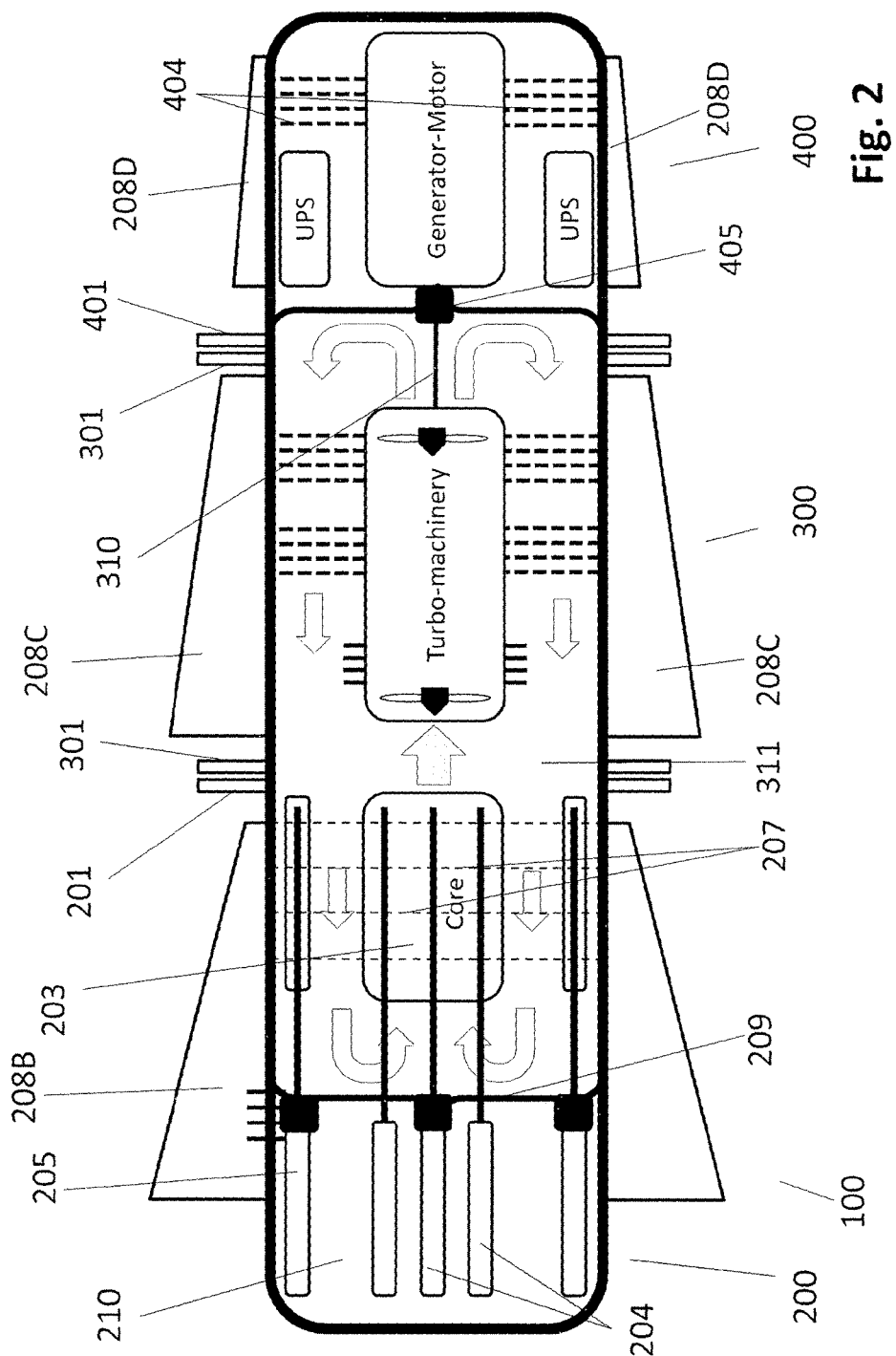
FIG. 2 is a top perspective cross-sectional view of an example transportable nuclear generator block diagram showing the single vessel comprising all the equipment for horizontal or vertical operation of the transportable nuclear generator.

FIG. 1 is a top perspective cross-sectional view of an example transportable nuclear generator 100 block diagram, indicating the boundaries of the reactor power module 200, the power conversion model 300, and the power generation module 400 of an exemplary implementation. FIG. 2 is a top perspective cross-sectional view of an example transportable nuclear generator block diagram showing the single vessel transportable nuclear generator 100 formed by coupling the three modules (reactor power module, power conversion module, and power generation module) and comprising all the integral equipment for horizontal or vertical operation.

Figure 3:
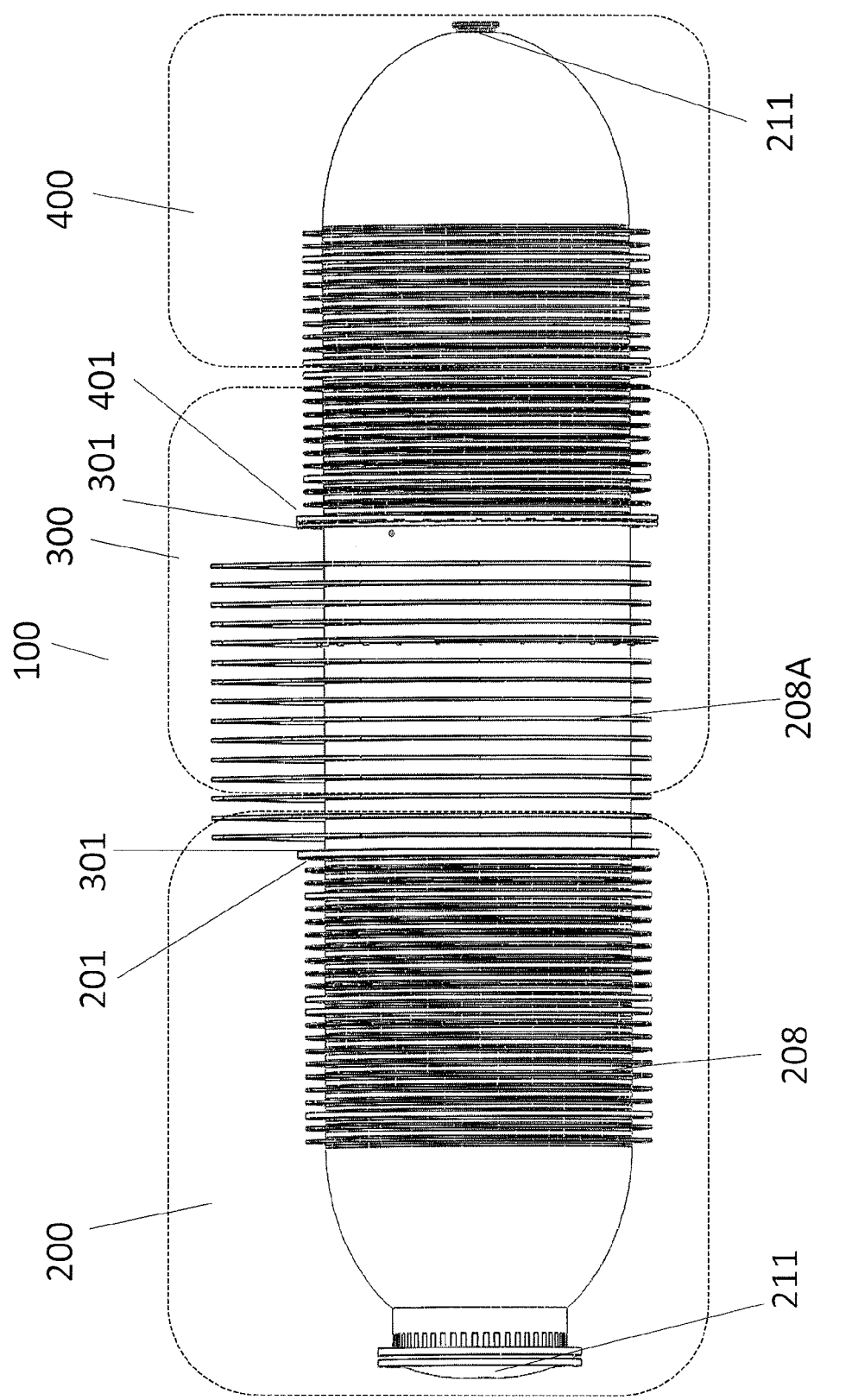
FIG. 3 is a side view of the example implementation shown in FIG. 1 illustrating the external transportable nuclear generator fins developed in a manner to provide enhanced heat transfer area for passive cooling, structural hardening and shielding features.

FIG. 3 is a side view of the example implementation shown in FIG. 1 illustrating each module comprising external fins 208 on the reactor power module, 208 and 208A on the power conversion module, and 208 on the power generation module. Fins 208 and 208A are developed in a manner to provide enhanced heat transfer area for passive cooling, structural hardening and shielding features of the transportable nuclear generator 100.

Referring to FIGS. 1 and 2, the transportable nuclear generator 100 is formed by three main modules: The swappable reactor power module 200, housing the core 203, control and core shutdown systems 204, core control and reflector system 205, coolant flow reversing structures 206 (shown in detail in FIG. 7), and passive core heat transfer structures 207. The reactor power module is coupled to the power conversion module 300, by a sealing and supporting flange 201. The power conversion module 300, is sealed to the reactor power module using sealing flange 301, and comprises turbo-machinery equipment 304, low backpressure heat exchangers "recuperator" 305, "pre-cooler" 306, and "intercooler" 307, flow reversing structures 309 (similar to 206) and a shaft 310 mechanically coupled to all rotary components of the power conversion module 300 and the power generator module 400. The power conversion module 300 is sealed and coupled to the power generation module 400 using flange 301. The power generation module 400 is sealed to the power conversion module 300 using sealing flange 401 and comprises a fast generator-motor 402 with embedded electronic controllers, Uninterruptable Power Sources 403 (i.e. batteries) to be utilized during start-up operations, generator integral cooling system/heat exchanger 404, sealing magnetic bearings 405 with interfacing and flexible coupling structures to mechanically couple with rotary shaft of turbo-machinery 304. Once thermal-hydraulically coupled through sealing flanges 201-301, 301-401, the three modules form a single hardened vessel 100 passively exchanging thermal energy with the surrounding environment using fins 208 and 208A. In addition to providing heat transfer features to ensure thermal energy transfer from the modules internals to the transportable nuclear generator 100 external environment, fins 208 and extended fins 208A have also structural hardening and shielding features. The pressure boundary formed by partition 209 in the reactor power module 200 allows for different coolants and separation of the environments represented by the primary pressure boundary 311 with a second pressure boundary represented by chamber 210 housing control systems 204 and 205. Similarly, partition 406 in the power generation module 400 allows sealing and separation of the generator-motor environment 407 from the environment 311 represented internally power conversion module 300. The rotary equipment forming the turbo-machinery systems 304 of the power conversion module 300, are mechanically coupled to a single shaft 310 also mechanically coupled to the shaft of the rotary components integrated in the generator-motor 402 of the power generation module 400, thus all of the rotary equipment is matched to rotate at the same speed using frictionless magnetic bearings 405 (only shown at one side of turbo-machinery system 301 and generator motor 402).

Each module may be transported independently, or all three fully assembled and forming a fully operational transportable nuclear generator vessel 100. All modules are interfaced through pressure and cabling fittings ports 211. These ports allow for coolant charging or discharging operations, monitoring and control of various electrical functions (i.e. control rod drive or rotary control and reflector mechanisms). Additionally, fitting ports 211 allows for electric bus connections from the generator-motor 402 to the electric grid at the site of deployment.

Fully assembled or in separate modules transport of the transportable nuclear generator 100 may be executed in compliance with transportation standards (i.e. utilizing standard transportation equipment). When transported fully assembled, the transportable nuclear generator 100 represents a rapidly deployable and retrievable fully operational electric power generator.

In one configuration, the materials forming the pressure vessels representing each module may utilize composite structures of Carbon and Silicon carbide as reflector and also as pressure boundary (pressure vessel). The use of a light weight low-neutron absorption vessel will allow the option of using external mechanisms of neutron reflection to improve the neutron economy of small size core 203 (FIG. 1).

In one exemplary configuration shown in FIG. 1, the transportable nuclear generator modules may be coupled using sealing and locking flanges 201-301 and 301-401 so as to form a single hardened pressure transportable nuclear generator vessel 100 operating horizontally. In another configuration, shown for example in FIG. 2, by re-orienting external transportable nuclear generator 100 heat transfer fins 208B, 208C and 208D, the transportable nuclear generator may be configured to operate vertically. All modules comprise highly integrated heat exchangers formed by internal fins 212, 207, 305, 306, 307 and 404, for example, shown in FIGS. 1 and 2. These integral heat exchangers are thermally coupled to external fins 208 and 208A in FIG. 1, and to fins 208B, 208C, and 208D (FIG. 2), when re-oriented for transportable nuclear generator 100 vertical operation or operation within underground installations. All internal fins in each module may be configured to provide support to internal components while substantially reinforcing the overall transportable nuclear generator structure as they form multiple structural ribs, thus hardening the whole transportable nuclear generator vessel 100, and as coolant flow channels.

In one configuration, the transportable nuclear generator 100 reactor control mechanisms may comprise control drive mechanisms 205 shown, for example, in FIG. 4, configured to control neutron absorbing materials 215 by inserting/withdrawing said materials 215 within regions of neutron reflectors 214, in addition to control drive mechanisms 204 configured to insert/withdraw neutron absorbing materials 216 into regions of core 203, and in addition to a central control rod drive mechanism 219 configured to insert neutron absorbing material within regions substantially central to core 203.

In another configuration, the transportable nuclear generator 100 reactor control mechanisms may comprise control drive mechanisms 221 (FIG. 6), configured to control neutron absorbing materials 215 by inserting/withdrawing said materials 215 within regions of neutron reflectors 214, in addition to control drive mechanisms 204 configured to insert/withdraw neutron absorbing materials 216 into regions of core 203, in addition to a central control drive mechanism 219, configured to insert/withdraw neutron absorbing materials 220 into/out of a substantially central location of core 203.

Figure 7:
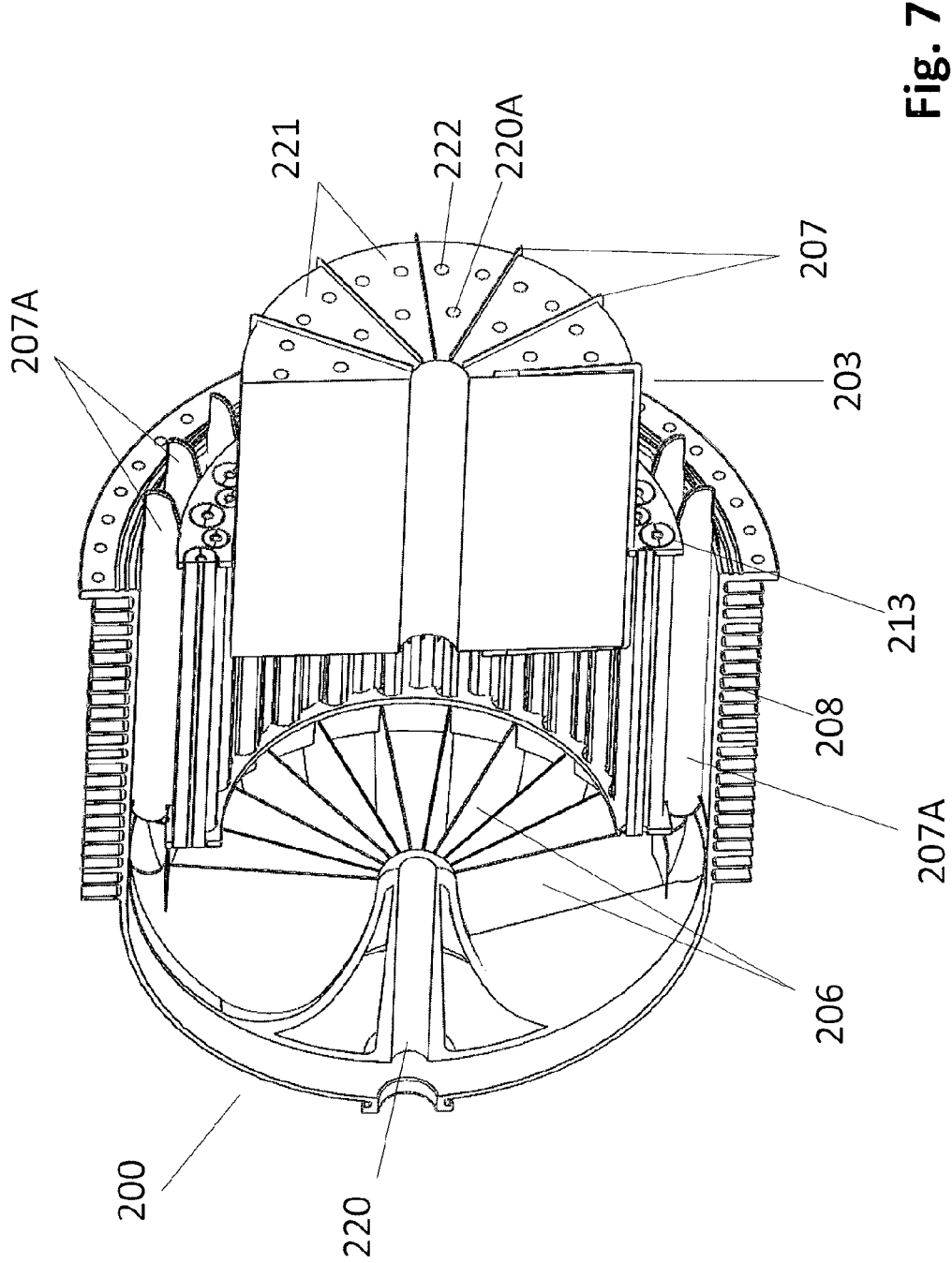
FIG. 7 is a cross-sectional perspective view of an example implementation of the reactor power module of the transportable nuclear generator shown in FIGS. 1 and 6.

In another configuration, shown in FIG. 7, the transportable nuclear generator 100 reactor may be configured to utilize a reactor power module 200 comprising reactor control mechanisms including rotary drums 213 containing neutron absorbing materials on one side and neutron scattering materials (reflector) on the opposite side of each rotary drum. The rotary drums 213 comprise a magnetic coupling that passively always orientates the drums by rotating them in a manner that the neutron absorbing materials face core 203, thus forcing a sub-critical condition of core 203. When the rotary control drums 213 are rotated using electromagnetic control (i.e. solenoid, electromagnetic, motor-assisted or pneumatic actuation, not shown in this FIG. 7), the rotary drum exposes the neutron reflective site to core 203, thereby increasing its criticality. In case of loss of electric power, the rotary control drum always passively orientate themselves in a manner that the neutron absorbing side faces core 203, thereby forcing shutdown conditions. This configuration remains effective even if transportable nuclear generator vessel 100 is dislodged from its supporting platform and rotated, for example, as a result of explosions induced by hostile events.

As shown in FIGS. 5, 6, 8, 9 and 21, the inlet and outlet sections of core 203, with respect to coolant flow direction, are faced by neutron reflectors 217, and 218 respectively. Additionally, the reactor power module comprises an emergency shutdown system that injects neutron poison in the core through a passive system if all other control systems fail.

To summarize aspects addressing reactor control, reactivity control for core 203 may be performed in one configuration by control rods 215 in the reflector 214, containing absorbing and reflecting material arranged in a way to be passively engaged in absorbing mode for safety, and by driving multiple in-core control rods 216. In a further configuration reactivity control for core 203 may be performed by driving in-core control rods 216, a central control rod 220 and rotary control drums 213, or a combination of these configurations in addition to emergency neutron poison injection to provide an additional independent core 203 shutdown mechanism. Control rod material is likely to be a SiC-based or C-based ceramic with boron or a rare earth absorbing material, and beryllium as reflector material.

With reference to FIG. 1, the integral heat exchanger 212, within the reactor power module 200, may be configured to provide passive cooling to control rod drive mechanisms 204 and 205. With reference to FIGS. 1, 2 and 5, integral heat exchangers 207 may be configured to passively remove decay heat from core 203 via conduction heat transfer between the inner core 203, and the reactor power module 200 external fins 208 (FIG. 1 and 3), or 208B (FIG. 2). Integral heat exchanger 207 may be configured to transfer decay thermal energy from core 203 even under total loss of coolant scenarios. In some configurations, core 203 may be formed by fuel elements thermally coupled to materials that form highly thermally conductive pathways 207 as shown, for example, in FIG. 7. With reference to FIGS. 4 and 5, the power conversion module 300 comprises a series of integral heat exchangers. These may be configured to function as recuperator 305, pre-cooler 306, and inter-cooler 307, in agreement with Brayton power cycle thermodynamic configuration. Additional, integral heat exchangers fully integrated into dedicated modules are represented by the generator-motor integral heat exchanger 404, integrated into the power generation module 400.

In one preferential configuration of the transportable nuclear generator integrated in the single vessel 100 of FIGS. 1, 2, 3, 4 and 5, the power conversion module 300 houses the turbo-machinery system 304 and integral heat exchanger hardware to convert the heat generated in the reactor power module 200 into mechanical power coupled into the rotating shaft 310. In order to couple rotary turbo-machinery on the same shaft 310, and in the enclosure represented by the power conversion module 300, and assuming gas 312 (FIG. 5) as a working fluid with proper thermo-physical characteristics, high temperature gas 312 produced by flowing through core 203 in the reactor power module, inlets gas turbines 304A.

Figure 6:
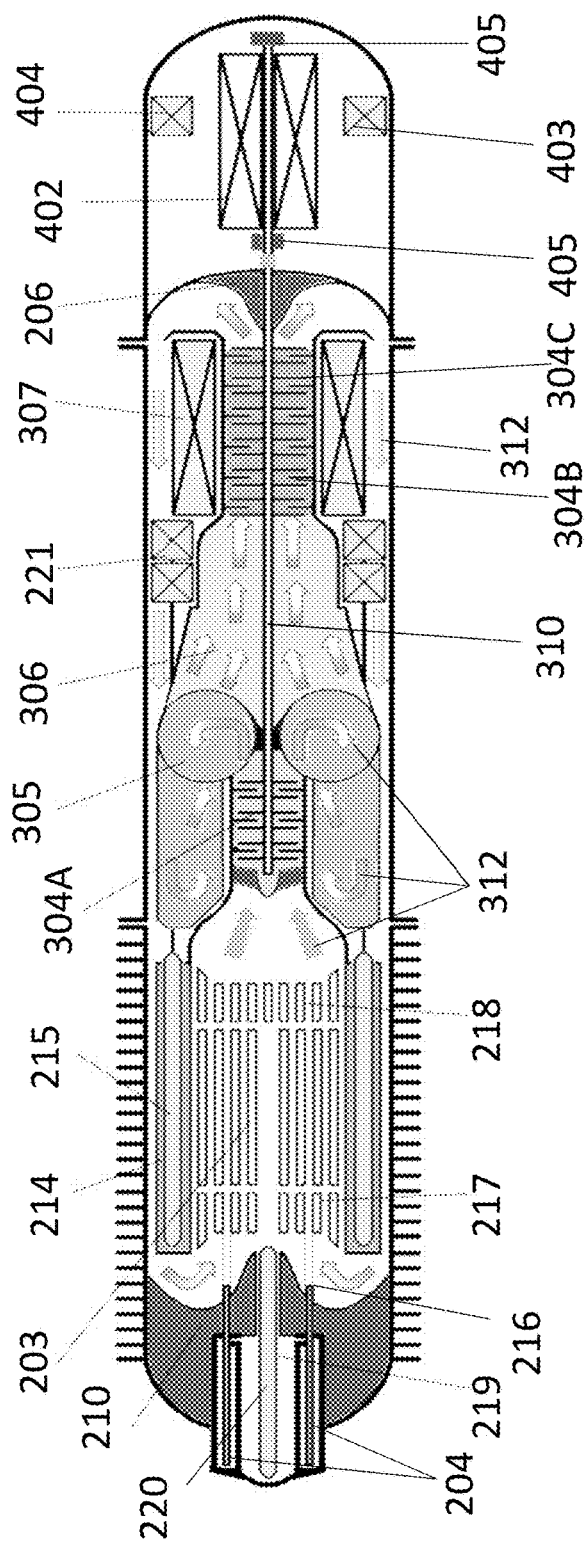
FIG. 6 is a detailed cross-sectional schematic view of the internals of the example implementation of a version of the transportable nuclear generator in FIG. 1.

With reference to FIGS. 5 and 6, after expansion in the various stages of turbines 304A, the gas enters the integral heat exchangers defined as recuperator 305, and pre-cooler 306 prior to entering low pressure side of compressor 304B and high pressure side of compressor 304C with the gas flowing through an integral intercooler heat exchanger 307, before reversing flow direction using a low-drag flow reversing structure 206 (FIG. 1), flow on the hot side of the recuperator 305, and finally resetting the Brayton gas cycle by inletting the cold side of core 203 in the reactor power module 200. The pre-cooler 306 and the inter-cooler 305 may be configured as gas to air or gas-to-liquid heat exchangers that transfer the residual waste heat to the ultimate heat sink passively via fins 208 and extended fins 208A (FIG. 3). In this configuration, the reactor cooling gas 312 and Brayton working gas 312 may be the same. Gas 312 may be $CO_2$, Helium, Argon or another fluid with thermal-physical properties that satisfy thermodynamic and core requirements.

Under the regenerative Brayton cycle configuration, the transportable nuclear generator power conversion efficiency may be approximately 45%. Bypass valve 313 allows execution of load following according to electric demand by essentially short-circuiting gas 312 exiting the core.

As shaft 310 is mechanically coupled to the power generation module 400 and the turbo-compressor in the power conversion module 300, the generator-motor 402 may be configured for start-up operations so as to use batteries integrated in uninterruptable power supply units 403 to convert the generator into a motor and use motor 402 as a drive for the turbo-machinery to act as a gas circulator system at startup and shutdown.

In one configuration, shaft 310 may be coupled to stationary elements of the power conversion module and power generation module using magnetic bearings 405 with catcher bearings engaging in case of sudden loss of electric power within the transportable nuclear generator control systems, electronic controllers or electro-magnetic bearing coils malfunction. To allow for the power conversion module to be separated (i.e. during individual module transport) from the power generation module, shaft 310 may be formed by two separate shafts coupled by a flexible high-speed coupler at the location of module coupling flanges 301-401. The integral turbo-machinery and generator-motor equipment, allow for operation without need for external balance of plant, thereby substantially decreasing overall footprint, vulnerabilities, and the probability for loss of coolant scenarios.

With reference to FIGS. 7, 8 and 9, the reactor power module 200 may employ several types of cores 203, including melt-proof conductive ceramic cores.

In one exemplary configuration shown in FIG. 7, core 203 is formed by fuel elements 221 with various geometries. Fuel elements 221 may be configured to comprise coolant flow paths 222 so as to ensure high efficiency conversion of thermal energy transferred to the coolant while circulating within the flow path. Coolant flow pathways 222 are configured to allow a fluid to flow through fuel elements 221 and/or to allow control mechanisms to be inserted or withdrawn from core 203.

In one configuration of core 203, to enhance conduction heat transfer mechanisms, cooling pathways 207 may be obtained by thermally coupling fuel elements 221 with fins that form the conductive cooling pathways 207 as they provide a heat transfer conduit from core 203 inner locations all the way to external fins 208 through internal fins 207A. Fins 207A may be configured to direct gas flow exiting the recuperator 305 into the flow reversing structures 206, while providing structural support for core 203 internals and heat transfer pathways to passively transfer thermal energy (i.e. decay heat) from the core to fins 208. Flow reversing structures 206 may be configured so as to offer low fluid-dynamic drag, and provide core structural support while ensuring transfer of decay thermal energy from the core to the transportable nuclear generator external fins 208 by conduction heat transfer mechanisms. Therefore, core 203 can safely and passively transfer decay thermal energy to the environment surrounding the transportable nuclear generator even in the total absence of coolant.

FIGS. 10, 10A and 10B are perspective views of an example implementation of a low backpressure recuperator integral heat exchanger integrated into the power conversion module 300. As shown in these FIGS. 10, 10A and 10B, the working fluid, gas 312, inlets the recuperator 305 on one side, executes a full 360°, loop and exits the recuperator (symmetrical in one exemplary configuration). In this manner gas 312 exchanges thermal energy with the inner surfaces of recuperator 305 without mixing with the fluids in thermal contact with the outer surfaces of recuperator 305.

Figure 11:
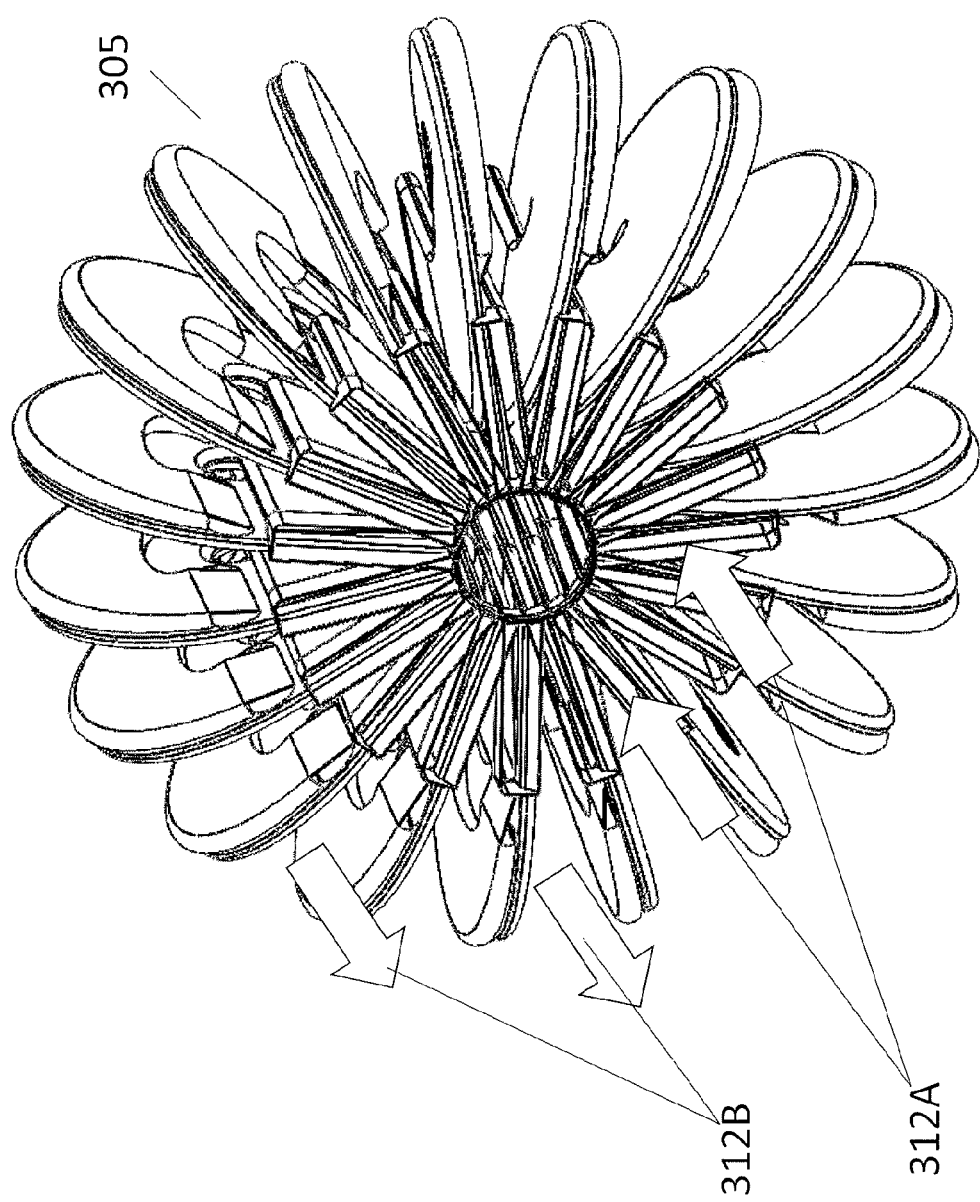
FIG. 11 is a perspective view of a fully assembled exemplary configuration of the low backpressure integral heat exchanger providing separation between the working fluid exiting the turbo-machinery and the fluid returning from the compressor illustrated in FIG. 6 and shown in FIGS. 10, 10A, and 10B.

FIG. 11 is a perspective view of a fully assembled exemplary configuration of the low backpressure integral recuperator 305 heat exchanger integrated in the power conversion module 300. This configuration provides separation between the working fluid 312A (hot gas) exiting the turbo-machinery, and the fluid 312B (cold gas) returning from the compressor 304C described in FIGS. 5 and 6.

Figure 12:
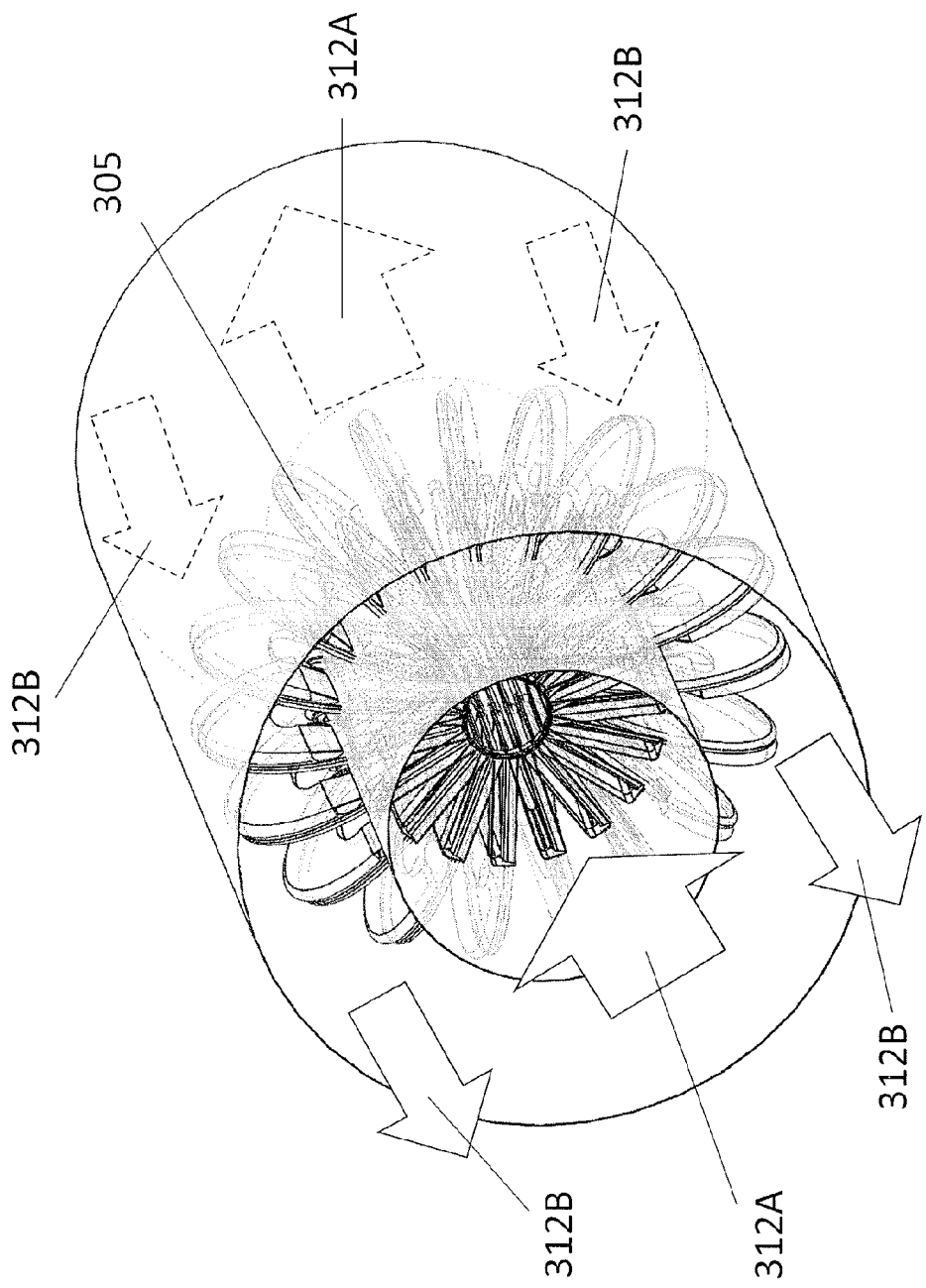
FIG. 12 is a perspective view of an example implementation of the fully assembled low backpressure integral heat exchanger illustrated in FIG. 11 illustrating the heat transfer induced by separate flow patterns between the fluid entering the inlets of the heat exchanger shown in FIG. 10 and the fluid returning from the intercooler sections of the power conversion module, thereby executing the function of recuperating thermal energy otherwise wasted at the discharge of the turbo-machinery dedicated to the expansion of the fluid of an example implementation of the transportable nuclear generator shown in FIG. 1 and FIG. 6.
Figure 13:
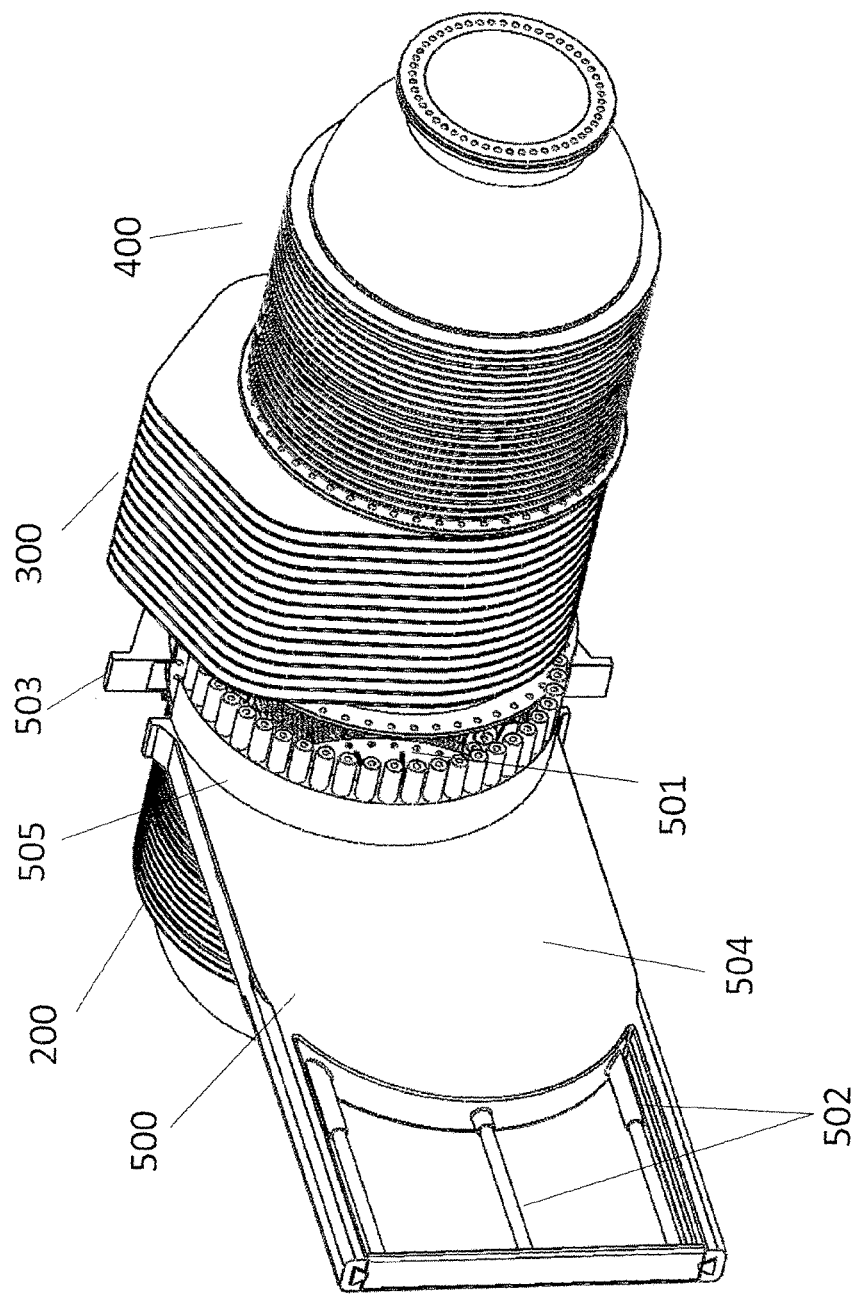
FIG. 13 is a perspective view of an example implementation of a device dedicated to remote and hydraulic hot reactor power module swapping and executing sealing of the reactor power module in preparation of transport or storage.
Figure 14:
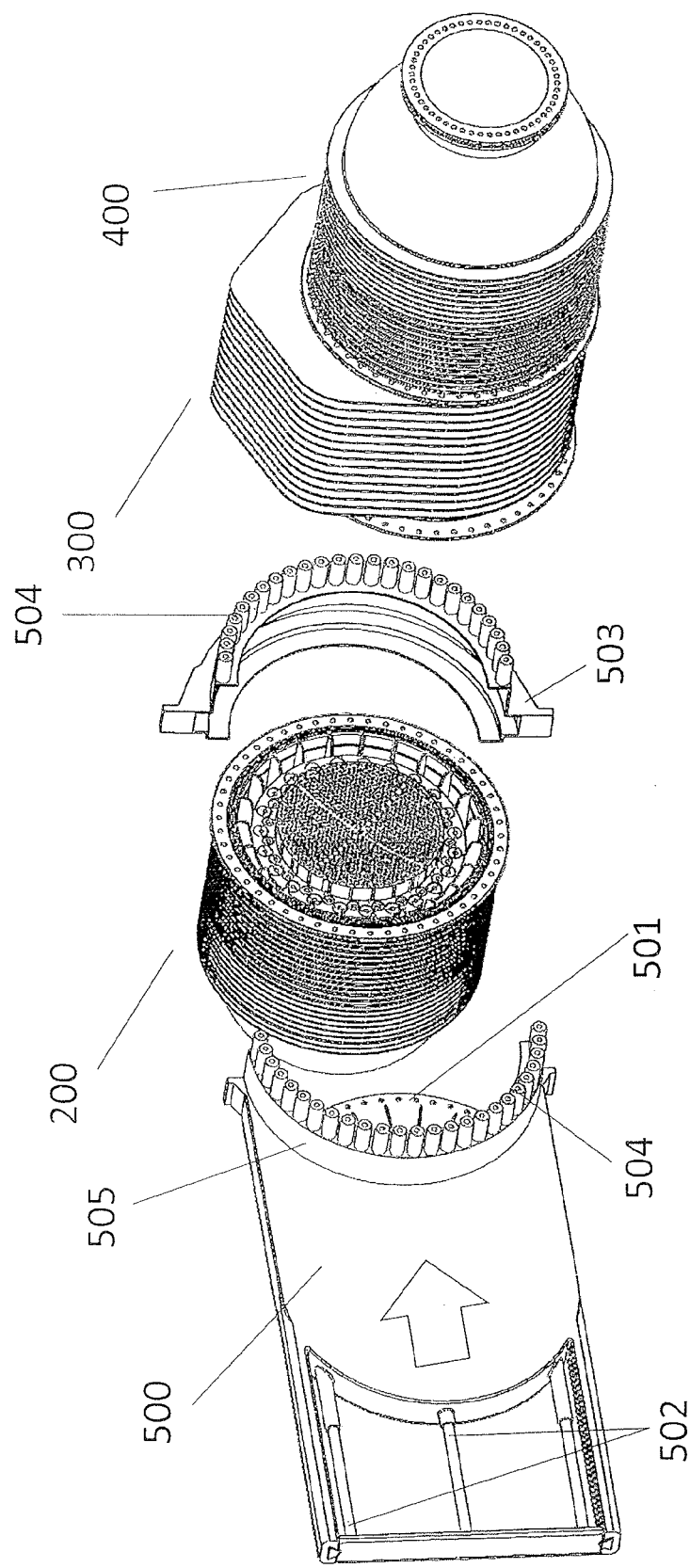
FIGS. 14 and 15 are perspective view illustrating an exemplary sequence adopted to de-couple the reactor power module from the fully assembled transportable nuclear generator and execute remote hydraulic module decoupling and sealing for reactor power module (core) swapping, or to execute maintenance on one side of the power conversion module.
Figure 15:
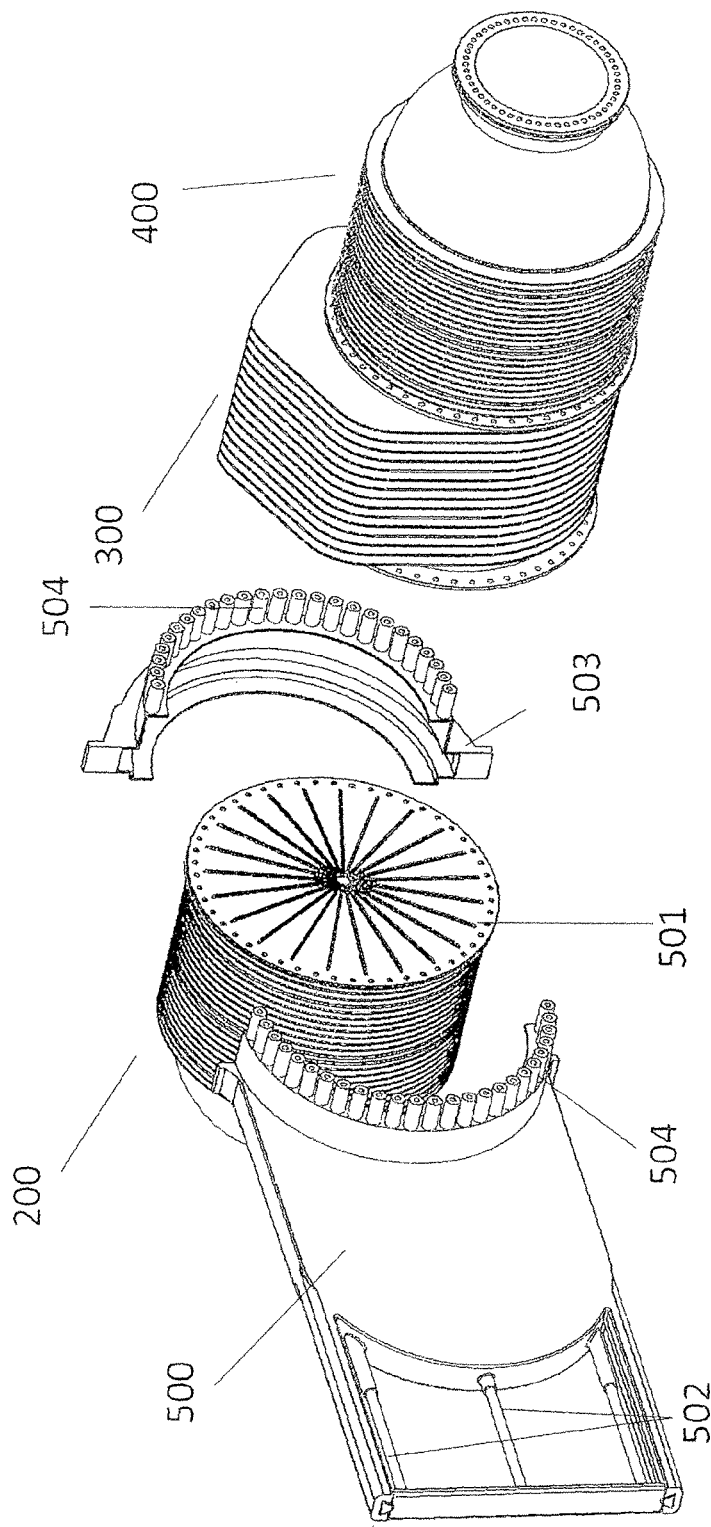

FIG. 12 is a perspective view of an example implementation of the fully assembled low back-pressure integral recuperator 305 heat exchanger in FIG. 11 illustrating the heat transfer induced by separate flow patterns between the fluid 312A inletting the inlets of the heat exchanger 305, shown in FIG. 10, and the fluid 312 B returning from the intercooler sections 307 of the power conversion module, thereby executing the function of recuperating thermal energy otherwise wasted at the discharge of the turbo-machinery with minimum backpressure due to the unique geometry of heat exchanger 305. FIG. 13 is a perspective view of an example implementation of a device configured to swap "hot" reactor power module and specialized to execute sealing of the reactor power module in preparation for transport or storage. As shown in this FIG., an example implementation of a module swapping device 500 utilizes a flange 505 to be coupled with flange 503 to execute sealing of the reactor power module 200 and de-coupling of power conversion module 300. As flanges 503 and 505 are coupled they seal against the flanges 201 and 301 shown in FIG. 1. Hydraulically activated fasteners 501 de-couple flanges 201 and 301 while mechanism 502 inserts a closing section 501 which seals reactor power module 200. FIGS. 14 and 15 are perspective view illustrating an exemplary sequence utilized by swapping device 500 to de-couple the reactor power module 200 from the fully assembled transportable nuclear generator single vessel 100 and seal reactor power module 200 with a sealing flange 501.

Figure 16:
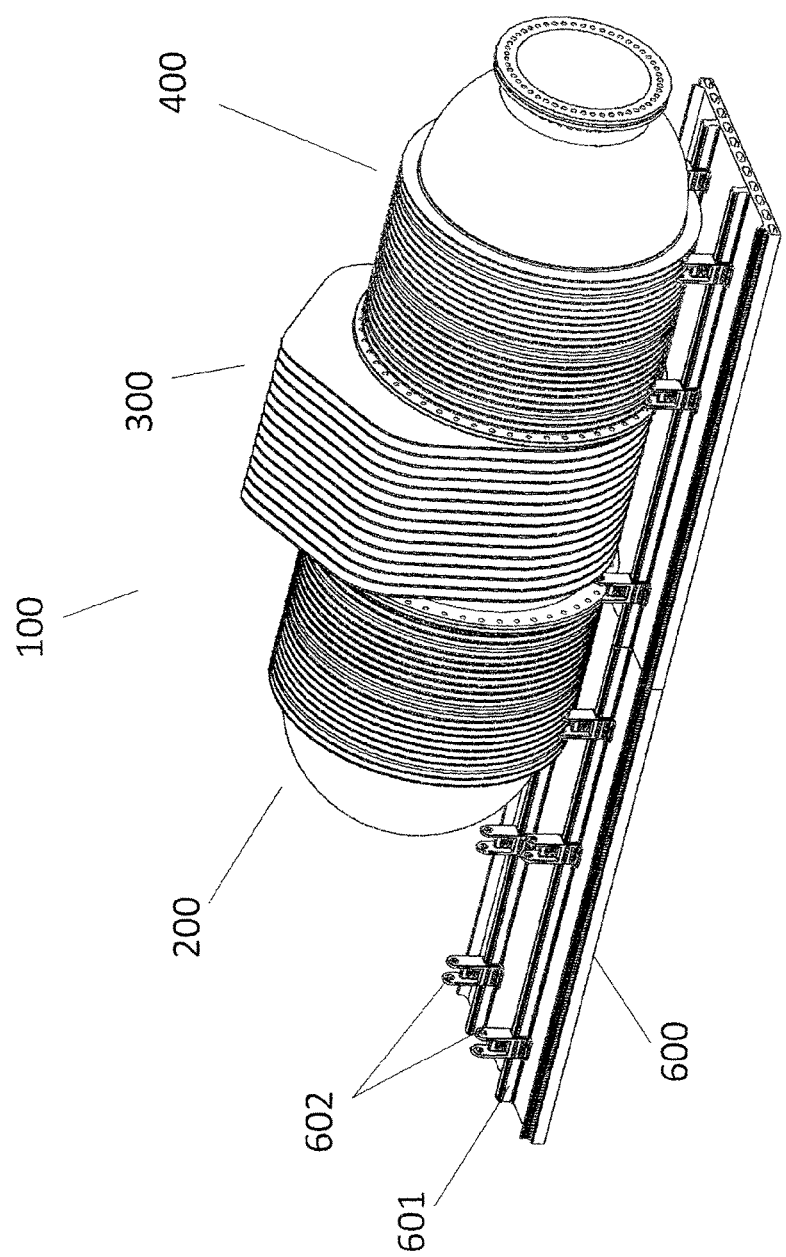
FIG. 16 is a perspective view illustrating an exemplary transport transportable nuclear generator platform compliant with transportation standards and equipped with guides to allow securing the modules during transport and operation and allowing sliding modules for rapid coupling or decoupling without needing heavy lifting cranes at the site of deployment.

FIG. 16 is a perspective view illustrating an exemplary modular transport platform 600 compliant with transportation standards and equipped with guides 601 to allow securing the modules 200, 300 and 400 during transport and operation. In this configuration, the modules can slide for rapid coupling or decoupling without needing heavy lifting cranes at the site of deployment.

Figure 17:
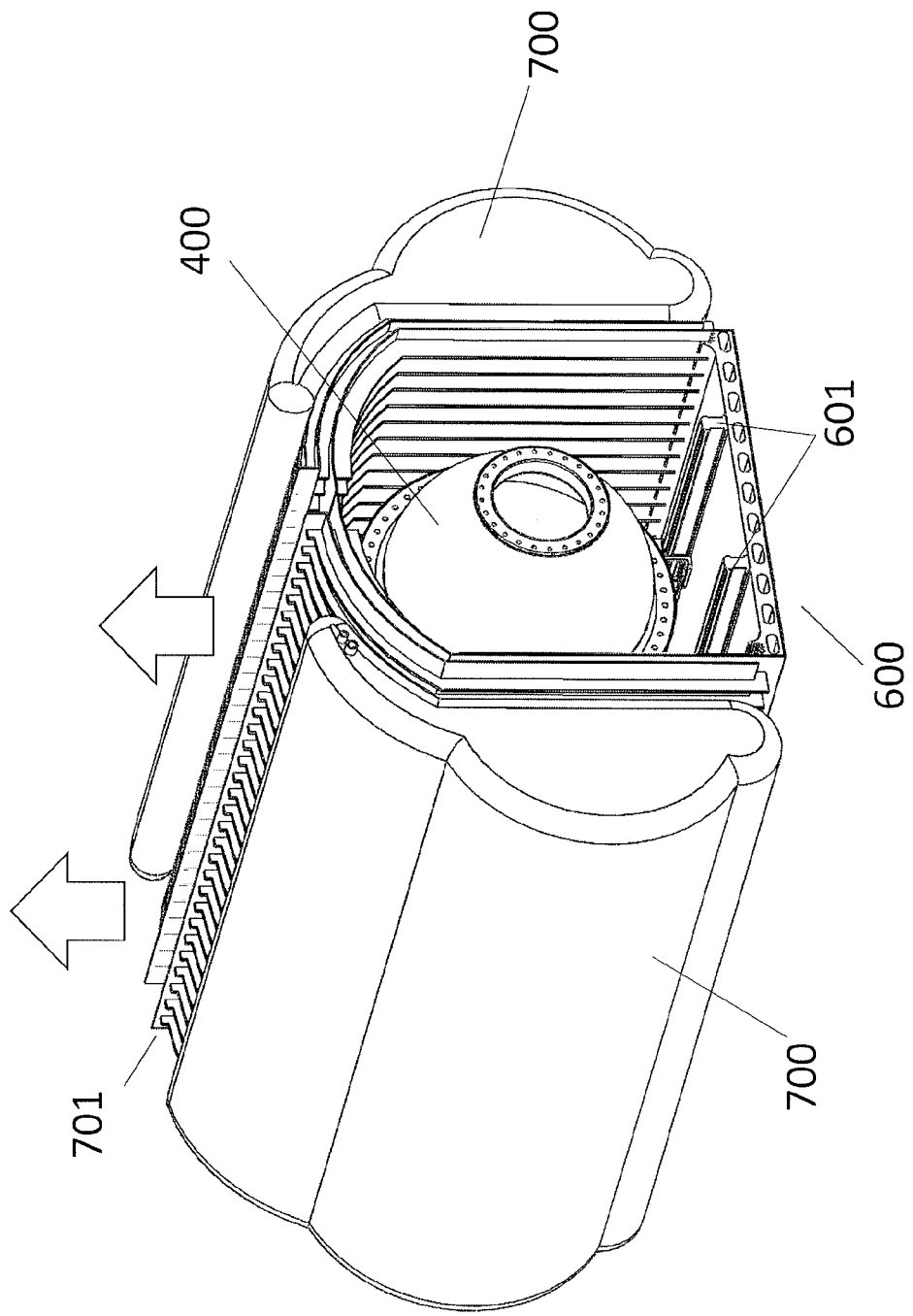
FIG. 17 is a perspective view illustrating the exemplary transport transportable nuclear generator platform shown in FIG. 16 with added shielding and passive cooling structures to execute rapid reactor power module hot retrieval (short time after shutdown).

FIG. 17 is a perspective view illustrating an exemplary transportable nuclear generator transport platform 600 shown in FIG. 16, with added shielding 700 and passive cooling structures 701 to allow rapid reactor power module 200 "hot" retrieval (core retrieval short time after shutdown). In this embodiment, the entire transportable nuclear generator single vessel 100, or only the reactor power module 200 may be flooded so as to increase heat transfer should the reactor power module 200 be transported a relatively short time after shutdown. In this configuration, the core continues to passively cool down while inflatable shields 700 may be filled with water so as to form a thick water wall to attenuate a radiation field during rapid core retrieval.

Figure 18:
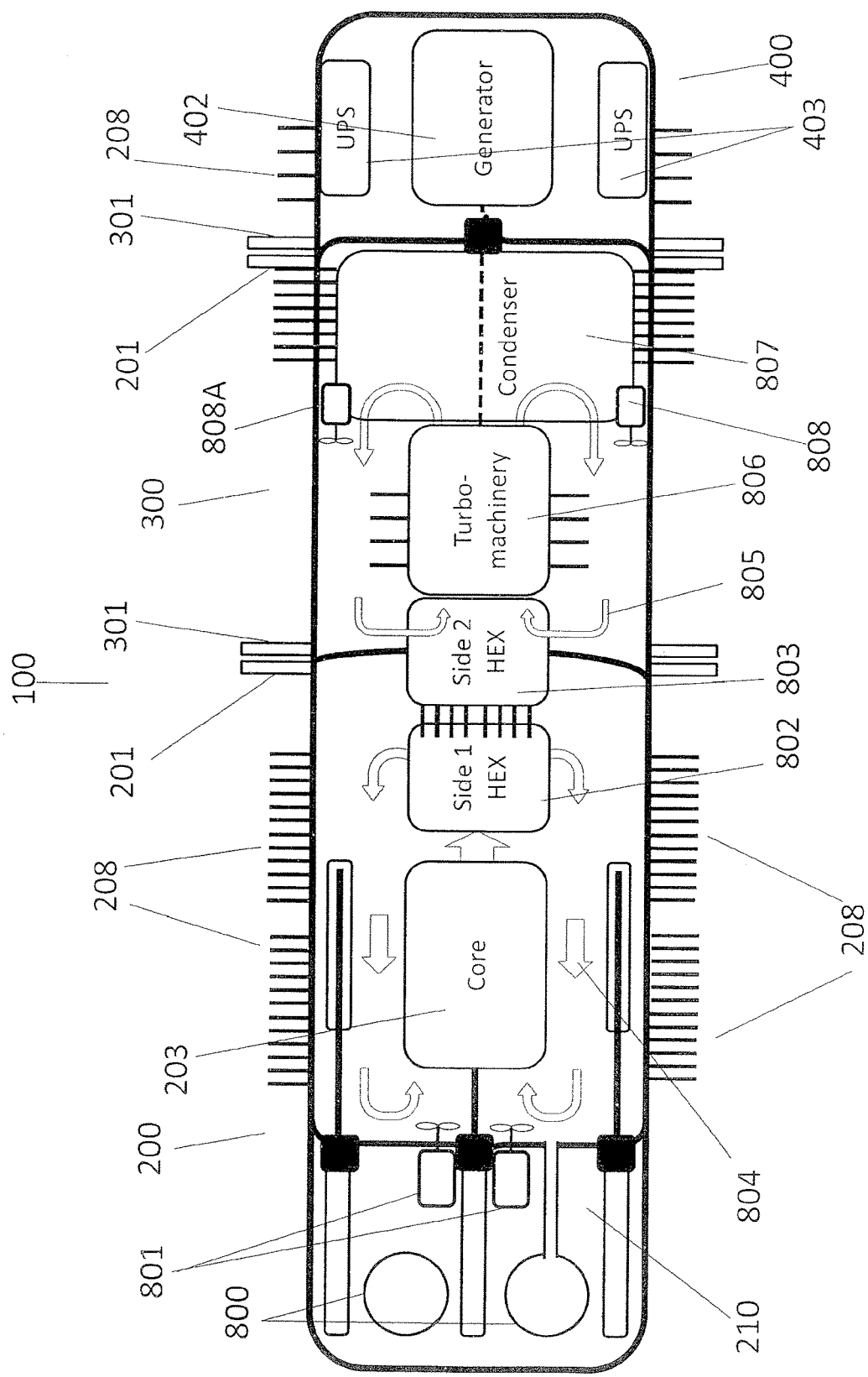
FIG. 18 is a top cross-sectional view of a modified version of the exemplary transportable nuclear generator block diagram showed in FIG. 1, wherein the single vessel comprising all the equipment for horizontal (or vertical) operation of the transportable nuclear generator is configured for operation with water as coolant and working fluid of a Rankine power cycle using a primary and secondary loops separated by at least one separation heat exchanger. This configuration of the transportable nuclear generator may also apply to a liquid metal-cooled reactor power module separated from the power conversion module by the separation heat exchanger and allowing utilization of a Brayton or Rankine power cycle.

FIG. 18 is a side cross-sectional view of a modified version of the exemplary transportable nuclear generator block diagram showed in FIG. 1, wherein the single vessel comprising all the equipment for horizontal (or vertical) operation of the transportable nuclear generator is configured for operation with water 804 as core 203 coolant circulating in a primary loop as for typical Pressurized Water Reactor (PWR). The working fluid 805 in the secondary loop forming a Rankine power cycle is also water. In this configuration the transportable nuclear generator comprises a primary and secondary loops separated by a separation heat exchanger whose primary side 802 receives thermal energy from core 203 through water 804 circulating by forced convection via reactor coolant pumps 801.

Figure 21:
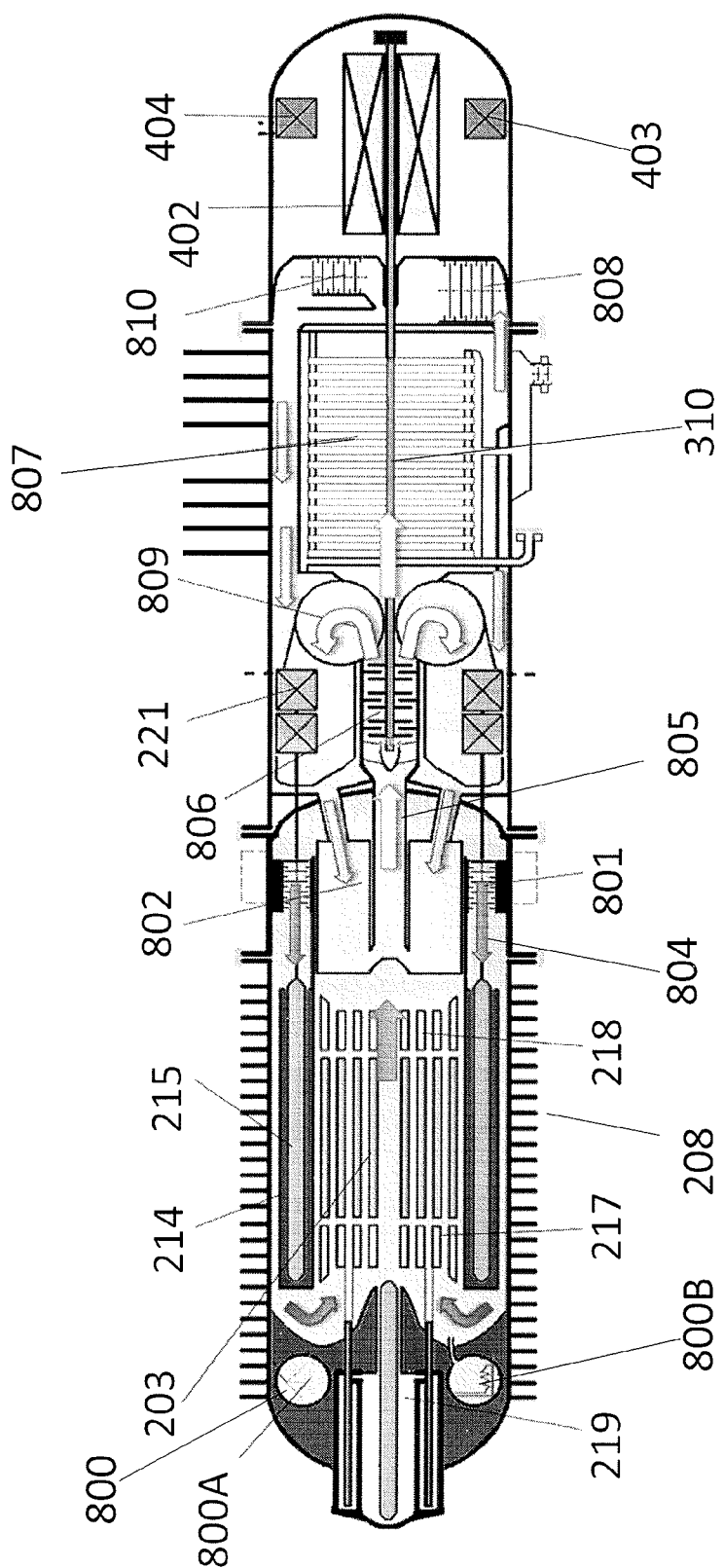
FIG. 21 is a detailed cross-sectional schematic view of the internals of the example implementation of a version of the transportable nuclear generator shown in FIG. 18.

With reference to FIGS. 18, 19, 20, and 21, in an exemplary configuration of the transportable nuclear generator operating with water as coolant and working fluid the reactor coolant pumps 801 may be configured as canned pumps positioned either on the dry head or chamber 210, as shown in FIG. 18, or on the annular jacket shown in FIG. 21. Pressure in the primary loop is regulated using a pressurizer 800 comprising heaters 800B and sprayer 800A (FIG. 21). Control and passive decay heat removal systems in this configuration are similar to those described in FIGS. 1-7.

The secondary loop represented by flow path 805 receives thermal energy from the primary loop using the separation heat exchanger 802 and 803. Water is circulated through the secondary side of heat exchanger 803 using feed-water pumps 808. As steam outlets the secondary side of separation heat exchanger 803, it expands in the turbo-machinery 806 wherein steam energy is converted into mechanical energy transferred to the power generation module 400 and the generator 402. Turbo-machinery 806 and fast generator 402 are mechanically coupled using shaft 310 and separation mechanisms between the power conversion module 300 and power generation module 400 as those described in FIGS. 1-7. As steam is vented at the discharge of turbo-machinery 806 it inlets an integral heat exchanger re-heater 809 (FIGS. 19 and 20) prior to condensing in the condenser 807, thus re-setting the Rankine power cycle.

Condenser 807 transfers thermal energy to the environment using fins 208 with gravity driven heat transfer mechanisms as those described in FIGS. 1-7. Short-term decay heat removal from core 203 may be executed in the absence of electric power by utilization of the UPS 403. For configurations wherein core 203 may be formed by melt proof ceramic materials, passive cooling by conduction mechanisms, even in the total loss of coolant scenario, ensure core temperatures below safety margins. The transportable nuclear generator configuration comprising a primary and a secondary loop operating at different pressure boundaries may also utilize a liquid metal-cooled reactor power module separated from the power conversion module by the separation heat exchanger and allowing utilization of a Brayton or Rankine power cycle in the secondary loop.

Figure 22:
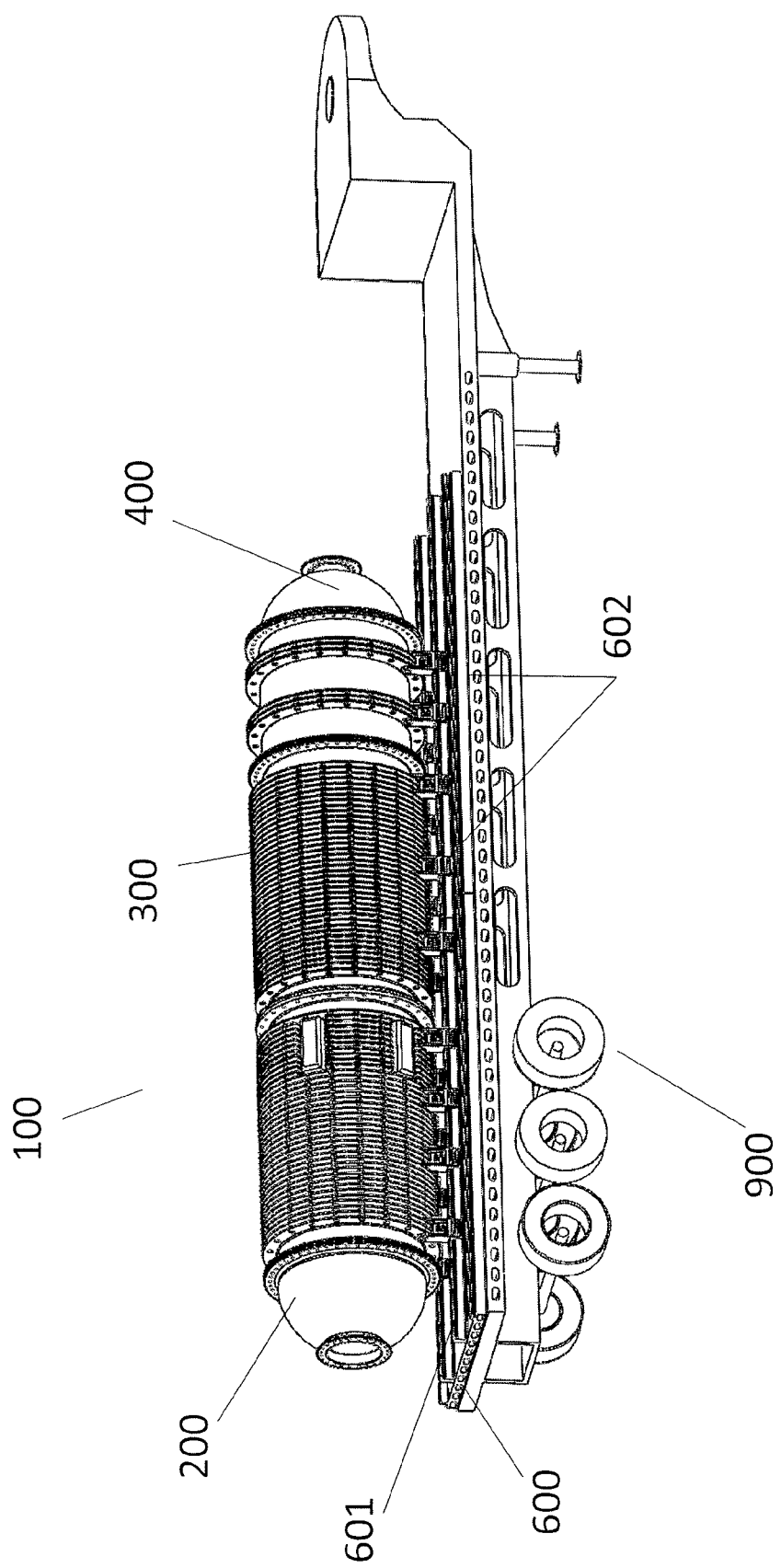
FIG. 22 is a perspective representation to provide a scale indication of an exemplary fully assembled transportable nuclear generator secured on a standard transport platform for rapid deployment and ready to generate power at any deployment site.

FIG. 22 is a perspective representation to provide a scale indication of an exemplary fully assembled transportable nuclear generator secured on a standard transport platform 900 for rapid deployment and ready to generate power at any deployment site, including sites with arid and extreme environmental conditions.

FIGS. 23 and 23A are perspective representations of an exemplary reactor power module of the transportable nuclear generator, secured on a standard transport platform 900 for rapid "hot" reactor power module transport (i.e. emergency site extraction), are shown with add-on passive cooling features 701 and inflatable shields 700 to ensure radioactive shielding under hot core removal scenarios.

FIGS. 24 and 24A are perspective views of preferential conductive ceramic core sections 221 and Fully Ceramic Micro-encapsulated (FCM) fuel elements 901 forming a melt-proof core that can be passively cooled even in total absence of coolant. FCM fuel utilizes low-neutron absorption ceramic composite materials as, for example, Silicon-Carbide (SiC). SiC composites have many advantages with respect to graphite for use in reactors as they have very low reaction kinetics with water and air at high temperature, do not produce carbon dust, have no Wigner effect from fast energy release at low temperature after irradiation, have good tolerance to radiation, it manifests very small dimensional change under irradiation, and offers non-porous impermeable barrier to fission product dispersion even at very high temperature.

In one configuration, core 203 may be formed by fuel elements 901 and 221 made of a composite structure of unidirectional fiber-reinforced NITE-sintered SiC with SIC fibers to insure toughness. Core 203 restraints and hot ducts and all flow paths 220A and control rod channels 222 are also made of fiber-reinforced composites. For example, the integral recuperator heat exchanger 305 shown in FIG. 6 may be formed with SiC PC (printed circuit) gas-gas heat exchanger, designed to fit in the annular space available around the turbomachinery so as to offer compactness, effectiveness and low back-pressure. Other SiC structures in core 203 include control rods, made of a sintered mix of SIC-$Gd^{203}$ and $Er^{203}$ and control rod sleeves. Finally the pressure vessel may be made of pre-stressed SiC composite. In some configurations, fuel elements 221 may provide partial cuts 906 and 905 to allow for controlled fractioning of fuel elements 221 without cracks propagating through compacts 902 or fuel elements 901 should these be subjected to severe kinetic stresses as those caused by explosion, for example, induced by hostile events (missile hit). In this manner, and as a result of catastrophic attack, fuel blocks or elements 221 may be fractured along controlled partial cuts 906 or 905, thereby leaving fuel elements 901 intact even under the most severe beyond design basis accident or attack scenario. This feature allows the core or its fractured fuel blocks 221 to contain all volatiles and significantly mitigate the consequences of a severe core breach scenario. As all radioactive volatiles remain trapped within fuel elements 901 under severe design basis and beyond design basis accident or attack scenarios, the transportable nuclear generator does not require evacuation planning zones as required by all SMR and large reactors.

Those of ordinary skilled in the art will understand how combinations of the features described may be formed to arrive at example implementations that may not be specifically shown in the figures.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A transportable nuclear generator, comprising:
a reactor power module comprising a nuclear core, control systems, and coolant flow reversing structure, wherein the reactor power module is configured to burn a nuclear fuel to generate thermal energy in a coolant/working fluid;
a power conversion module comprising turbo-machinery equipment and heat exchangers, wherein the power conversion module is configured to receive the thermal energy from the coolant/working fluid from the reactor power module and to generate mechanical energy; and
a power generation module comprising a fast generator-motor, electronic controllers and uninterruptable power sources, wherein the power generation module is configured to receive mechanical energy from the power conversion module and to generate electrical energy,
wherein the reactor power module, the power conversion module, and the power generation module are configured to be thermo-hydraulically coupled to one another to form an operational nuclear reactor as a single vessel.

2. The transportable nuclear generator of claim 1, wherein the reactor power module, the power conversion module, and the power generation module are configured to be interchangeably assemblable in a horizontal or vertical configuration.

3. The transportable nuclear generator of claim 1, wherein the reactor power module, the power conversion module, and the power generation module are further configured to be passively cooled via natural coolant-circulation across heat transfer surfaces.

4. The transportable nuclear generator of claim 1, wherein the reactor power module, the power conversion module, and the power generation module are further configured to operate as a self-contained unit without requiring external piping or equipment.

5. The transportable nuclear generator of claim 1, wherein the reactor power module comprises a melt-proof thermally conductive ceramic nuclear core.

6. The transportable nuclear generator of claim 1, further comprising coolant pathways defined by internal fins with low fluid-dynamic drag that provide core structural support while ensuring transfer of decay thermal energy from the core to external fins by conduction heat transfer mechanisms, wherein the coolant pathways are configured to safely and passively transfer decay thermal energy to an environment surrounding the transportable nuclear generator even in the total absence of coolant.

7. The transportable nuclear generator of claim 1, wherein the reactor power module further comprises at least one of the following reactivity control systems:
  (1) control rods or rotary control drums in a neutron reflector, containing neutron absorbing and reflecting materials configured to be passively engaged in absorbing mode for safety;
  (2) an array of in-core control rods;
  (3) an emergency shutdown system that injects neutron poison into the core through a passive system.

8. The transportable nuclear generator of claim 1, further comprising an inert gas as coolant and working fluid for the power conversion module.

9. The transportable nuclear generator of claim 1, wherein the reactor power module, the power conversion module, and the power generation module are further configured to perform a regenerative Brayton cycle to generate electricity.

10. The transportable nuclear generator of claim 1, further comprising:
  a primary loop fully enclosed in the reactor power module;
  water as a coolant and moderator circulating in the primary loop;
  one or more integral separation heat exchangers configured to provide thermal coupling between the primary loop in the reactor power module and a secondary loop in the power conversion module;
  water circulating in the secondary loop that receives thermal energy from the primary loop to generate superheated steam, wherein water in the secondary loop transfers thermal energy to the integral turbo-machinery in the power conversion module in the form of superheated steam to generate electricity according to a Rankine power cycle; and
  an integral condenser, wherein after expanding in the turbo-machinery, steam is vented to the integral condenser which passively transfers thermal energy to internal and externally extended cooling fins of the power conversion module to condense the steam.

11. The transportable nuclear generator of claim 10, further comprising one or more pumps that re-pressurize condensed steam and pump the resulting sub-cooled water at an inlet of a secondary side of the separation heat exchanger into the secondary loop.

12. The transportable nuclear generator of claim 1, further comprising:
  a primary loop fully enclosed in the reactor power module;
  liquid metal as coolant actively circulated by recirculation pumps in the primary loop;
  one or more integral separation heat exchangers configured to provide thermal coupling between the primary loop in the reactor power module and a secondary loop in the power conversion module;
  gas or water circulating in the secondary loop,
  wherein when gas is circulating in the secondary loop, the turbo-machinery is configured to satisfy the requirements of a regenerative Brayton power cycle, and
  wherein when water is circulating in the secondary loop, the turbo-machinery is configured to satisfy Rankine power cycle requirements.

13. The transportable nuclear generator of claim 1, further comprising:
  rotary components forming the turbo-machinery in the power conversion module;
  rotary components forming a generator-motor of the power generation module;
  a rotary shaft that connects the rotary components forming the turbo-machinery in the power conversion module and the rotary components forming a generator-motor of the power generation module in the form of a direct mechanical coupling so that the rotary components forming the turbo-machinery and the rotary components forming a generator-motor rotate with a common speed,
  wherein the rotational speed of the shaft is determined by the thermal-hydraulics of the power conversion system, loading conditions and settings of the electronic control system regulating the electric generator-motor machine, and
  wherein a frequency and other electrical parameters of the generator power are controllable by integral electronic conditioning circuits.

14. The transportable nuclear generator of claim 13, wherein:
  the generator-motor generates electricity during operation of the transportable nuclear generator,
  the generator-motor drives the turbo-machinery of the power conversion module during startup and after shutdown, and
  startup power is provided to the generator-motor during startup through uninterruptable power sources or an external source of electric power.

15. The transportable nuclear generator of claim 1, wherein the reactor power module is further configured to allow removal of a reactor power module containing fresh or spent nuclear fuel and replacement with a new reactor power module having fresh nuclear fuel.

16. The transportable nuclear generator of claim 1, further comprising heat exchangers for the production of low-and/or high-grade process heat to be distributed to equipment dedicated to desalination, bio-fuel processing, district heating, or other industrial uses.

17. A method of generating electricity, comprising:
  providing the transportable nuclear generator of claim 1; and
  operating the transportable nuclear generator in one of the following modes:
    (1) according to a regenerative Brayton power cycle to generate electricity using an inert gas as a working fluid;
    (2) according to a Rankine power cycle to generate electricity when water is used as a working fluid.

18. The method of claim 17, further comprising operating the transportable nuclear generator in a horizontal or vertical configuration.

19. The method of claim 17, wherein the transportable nuclear generator further comprises:
  integrated heat exchangers formed by internal and external fins configured to provide passive cooling; and
  an emergency shutdown system that injects neutron poison into the core through a passive system if other systems fail.

20. A method of refueling a transportable nuclear generator, the method comprising: providing the transportable nuclear generator of claim 15;
removing a first reactor power module having fresh or spent nuclear fuel; and replacing the first reactor power module with a second reactor power module having fresh nuclear fuel.

21. The transportable nuclear generator of claim 5, wherein the melt-proof thermally conductive ceramic nuclear core further comprises:
monolithic fuel elements (MTF) comprising tri-structural isotropic (TRISO) fissile fuel sealed in SiC pellets.

22. The transportable nuclear generator of claim 21, wherein the SiC pellets are nano-infiltration and transient eutectic-phase (NITE) sintered pellets.

23. The transportable nuclear generator of claim 21, wherein the MTF elements comprise the TRISO fissile fuel SiC pellets sealed into SiC or SiC-composite elements.

24. The transportable nuclear generator of claim 21, wherein the TRISO fuel pellets further comprise a layer of unfueled SiC surrounding a fueled region.

25. The transportable nuclear generator of claim 21, wherein the TRISO fuel pellets further comprise an oxide, carbide, oxy-carbide or a nitride of uranium, plutonium, thorium or other fissile isotope.

26. The transportable nuclear generator of claim 21, wherein the TRISO fuel pellets further comprise a burnable poison rare earth oxide comprising erbia or gadolinia incorporated in the SiC pellets.

27. The transportable nuclear generator of claim 21, wherein the melt-proof thermally conductive ceramic nuclear core further comprises non-fuel coated particles comprising a burnable poison.

28. The transportable nuclear generator of claim 21, wherein the melt-proof thermally conductive ceramic nuclear core further comprises fuel elements comprising a composite structure of unidirectional fiber-reinforced NITE-sintered SiC with SIC fibers.

29. The transportable nuclear generator of claim 21, wherein the TRISO fuel pellets further comprise a high-density non-porous SiC coating.

30. The transportable nuclear generator of claim 21, wherein:
the MTF elements comprise rectangular blocks, hexagonal blocks, or quarter-circle plates, and
wherein the MTF elements comprise holes that provide flow pathways for a coolant.

31. The transportable nuclear generator of claim 30, further comprising:
neutron reflector elements comprising carbon or SiC, wherein the neutron reflector elements are geometrically configured to correspond to the geometric configuration of the MTF elements.

32. The transportable nuclear generator of claim 30, wherein the MTF elements are spaced so as to eliminate gaps between MTF elements to thereby enhance the thermal conductivity of the conductive ceramic core and to enhance core passive heat transfer properties.

33. The transportable nuclear generator of claim 21, wherein the melt-proof thermally conductive ceramic nuclear core further comprises:
pressure plates provided at an inlet and outlet of the core, wherein the pressure plates comprise matching coolant holes that provide flow pathways for a coolant, and
wherein the pressure plates are configured to provide a compressive force that keeps the core under compression.

34. The transportable nuclear generator of claim 21, wherein the melt-proof thermally conductive ceramic nuclear core further comprises:
fuel rods containing nuclear fissile material in the form of oxide, nitride, or metal, with metallic or ceramic cladding and arranged in bundles.

35. The transportable nuclear generator of claim 34, wherein the bundles are geometrically arranged so as to have favorable heat transport properties relative to a coolant.

36. The transportable nuclear generator of claim 21, wherein the melt-proof thermally conductive ceramic nuclear core further comprises loose fuel elements in the form of spherical pebbles.

37. The transportable nuclear generator of claim 21, wherein the melt-proof thermally conductive ceramic nuclear core is configured to allow passive cooling even in the absence of a coolant.

38. The transportable nuclear generator of claim 21, wherein the melt-proof thermally conductive ceramic nuclear core further comprises control rods, made of a sintered mix of $SiC\text{-}Gd^{203}$ and $Er^{203}$ and control rod sleeves.

39. The transportable nuclear generator of claim 21, wherein the melt-proof thermally conductive ceramic nuclear core further comprises control rod channels made of fiber-reinforced carbon or SiC composite materials.

40. The transportable nuclear generator of claim 21, wherein the MTF elements comprise partial cuts to allow for controlled fracturing of the MTF elements without cracks propagating into the TRISO fuel pellets in the event that the transportable nuclear generator is subjected to severe kinetic stresses or impacts.

* * * * *